US012026809B2

(12) United States Patent
Kumar et al.

(10) Patent No.: US 12,026,809 B2
(45) Date of Patent: Jul. 2, 2024

(54) SYSTEMS FOR GENERATING ANTI-ALIASED VECTOR OBJECTS

(71) Applicant: Adobe Inc., San Jose, CA (US)

(72) Inventors: Harish Kumar, Noida (IN); Anmol Sud, New Delhi (IN)

(73) Assignee: Adobe Inc., San Jose, CA (US)

( * ) Notice: Subject to any disclaimer, the term of this patent is extended or adjusted under 35 U.S.C. 154(b) by 207 days.

(21) Appl. No.: 17/307,219

(22) Filed: May 4, 2021

(65) Prior Publication Data

US 2022/0366621 A1 Nov. 17, 2022

(51) Int. Cl.
*G06T 11/20* (2006.01)
*G06T 11/40* (2006.01)
*G06T 11/60* (2006.01)
*H04L 51/222* (2022.01)
*H04L 51/52* (2022.01)
*H04N 23/63* (2023.01)

(52) U.S. Cl.
CPC .......... *G06T 11/203* (2013.01); *G06T 11/40* (2013.01); *G06T 11/60* (2013.01)

(58) Field of Classification Search
CPC ......... G06T 11/40; G06T 11/60; G06T 11/203
See application file for complete search history.

(56) References Cited

U.S. PATENT DOCUMENTS

| 5,479,590 A | 12/1995 | Lin | |
| 9,251,607 B1* | 2/2016 | Milne | ................... G06T 11/203 |
| 11,645,793 B2 | 5/2023 | Kumar et al. | |
| 2004/0197028 A1 | 10/2004 | Lin et al. | |
| 2005/0035976 A1* | 2/2005 | Ecob | ..................... G06T 15/503 345/611 |
| 2008/0309676 A1* | 12/2008 | Nehab | ....................... G06T 9/00 345/611 |
| 2012/0075310 A1 | 3/2012 | Michail et al. | |
| 2018/0033168 A1* | 2/2018 | Beri | ..................... G06T 3/4084 |
| 2022/0139009 A1 | 5/2022 | Kumar et al. | |
| 2022/0366637 A1* | 11/2022 | Seegert | ................... G06T 15/10 |

OTHER PUBLICATIONS

"Notice of Allowance", U.S. Appl. No. 17/068,419, filed Sep. 15, 2021, 9 pages.

(Continued)

*Primary Examiner* — Chante E Harrison
(74) *Attorney, Agent, or Firm* — FIG. 1 Patents

(57) ABSTRACT

In implementations of systems for generating anti-aliased vector objects, a computing device implements an anti-aliasing system to receive input data describing a Bezier curve of a vector object. The anti-aliasing system generates an aliased curve by rasterizing the Bezier curve in a pixel space having pixels including intersected pixels that are intersected by the aliased curve and non-intersected pixels that are not intersected by the aliased curve. The anti-aliasing system segments the pixels into segments in a virtual space, and the segments have a higher density than the pixels. An intersected segment is identified that is intersected by a portion of the aliased curve in the virtual space. The anti-aliasing system determines a winding number for the intersected segment and generates a portion of an anti-aliased curve for display in a user interface by applying a color value to a coverage mask for an intersected pixel of the pixels.

20 Claims, 16 Drawing Sheets

(56) References Cited

OTHER PUBLICATIONS

"Pre-Interview First Office Action", U.S. Appl. No. 17/068,419, filed Jul. 30, 2021, 8 pages.
Kumar, Harish et al., "U.S. Appl. No. 17/068,419", filed Oct. 12, 2020, Oct. 12, 2020, 52 pages.
U.S. Appl. No. 17/572,546 , "Corrected Notice of Allowability", U.S. Appl. No. 17/572,546, filed Apr. 6, 2023, 2 pages.
U.S. Appl. No. 17/572,546 , "Non-Final Office Action", U.S. Appl. No. 17/572,546, Jan. 4, 2023, 7 pages.
U.S. Appl. No. 17/572,546 , "Notice of Allowance", U.S. Appl. No. 17/572,546, filed Mar. 3, 2023, 7 pages.

\* cited by examiner

Fig. 3E

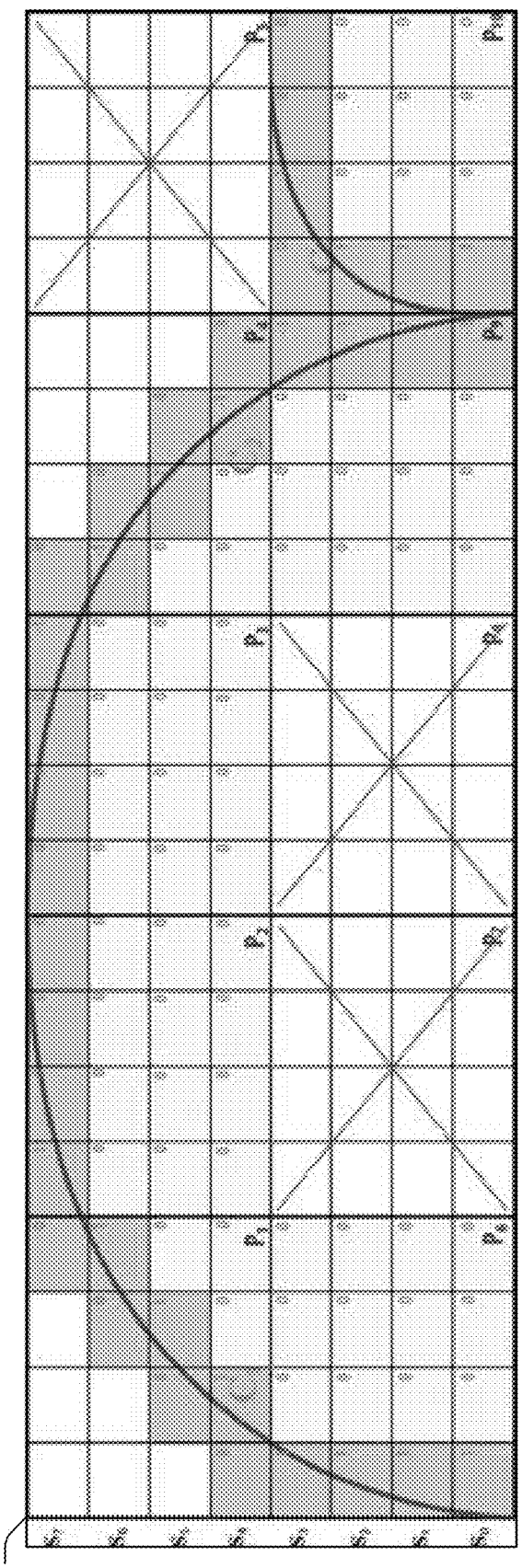

400

SYSTEMS FOR GENERATING ANTI-ALIASED VECTOR OBJECTS

BACKGROUND

In systems for creating and editing digital content, it is generally undesirable to render and display elements of the digital content such as graphic objects as having an aliased appearance. A graphic object has an aliased appearance when its edges appear "jagged" and unnatural which is caused by contrasts in color values of adjacent pixels along these edges. For example, edge pixels of the object that are colored black and that are adjacent to pixels colored white appear to "stairstep" which is not aesthetically pleasing.

Anti-aliasing systems prevent graphic objects from having an aliased appearance by generating transitionally colored edge pixels such as generating a grey colored pixel between a black edge pixel and a neighboring white pixel. This causes edges of a graphic object to appear smooth and improves a visual appearance of the object. Conventional anti-aliasing systems such as supersampling systems generate the transitionally colored edge pixels by sampling multiple colors of each pixel of a graphic object and computing an average color value from the multiple samples for the transitionally colored edge pixels. However, supersampling is computationally expensive and also consumes a large amount of memory. This leads to rendering delays and performance degradation particularly when displaying graphic objects on display devices at a high resolution, e.g., a 4K resolution.

SUMMARY

Techniques and systems are described for generating anti-aliased vector objects. In an example, a computing device implements an anti-aliasing system to receive input data describing a Bezier curve of a vector object. The anti-aliasing system generates an aliased curve by rasterizing the Bezier curve in a pixel space having pixels including intersected pixels that are intersected by the aliased curve and non-intersected pixels that are not intersected by the aliased curve. The anti-aliasing system segments the pixels into segments in a virtual space. For example, the segments have a higher density than the pixels.

The anti-aliasing system identifies an intersected segment that is intersected by a portion of the aliased curve in the virtual space. In an example, the anti-aliasing system determines a winding number based on a direction of the portion of the aliased curve. A coverage mask is computed for an intersected pixel that includes the intersected segment based at least partially on the winding number. The anti-aliasing system generates a portion of an anti-aliased curve for display in a user interface by applying a color value of the aliased curve to the coverage mask for the intersected pixel.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, 3D, 3E, 3F, 3G, 3H, 3I, and 3J illustrate an example of determining a coverage mask for generating an anti-aliased curve.

DETAILED DESCRIPTION

Overview

Figure 1:
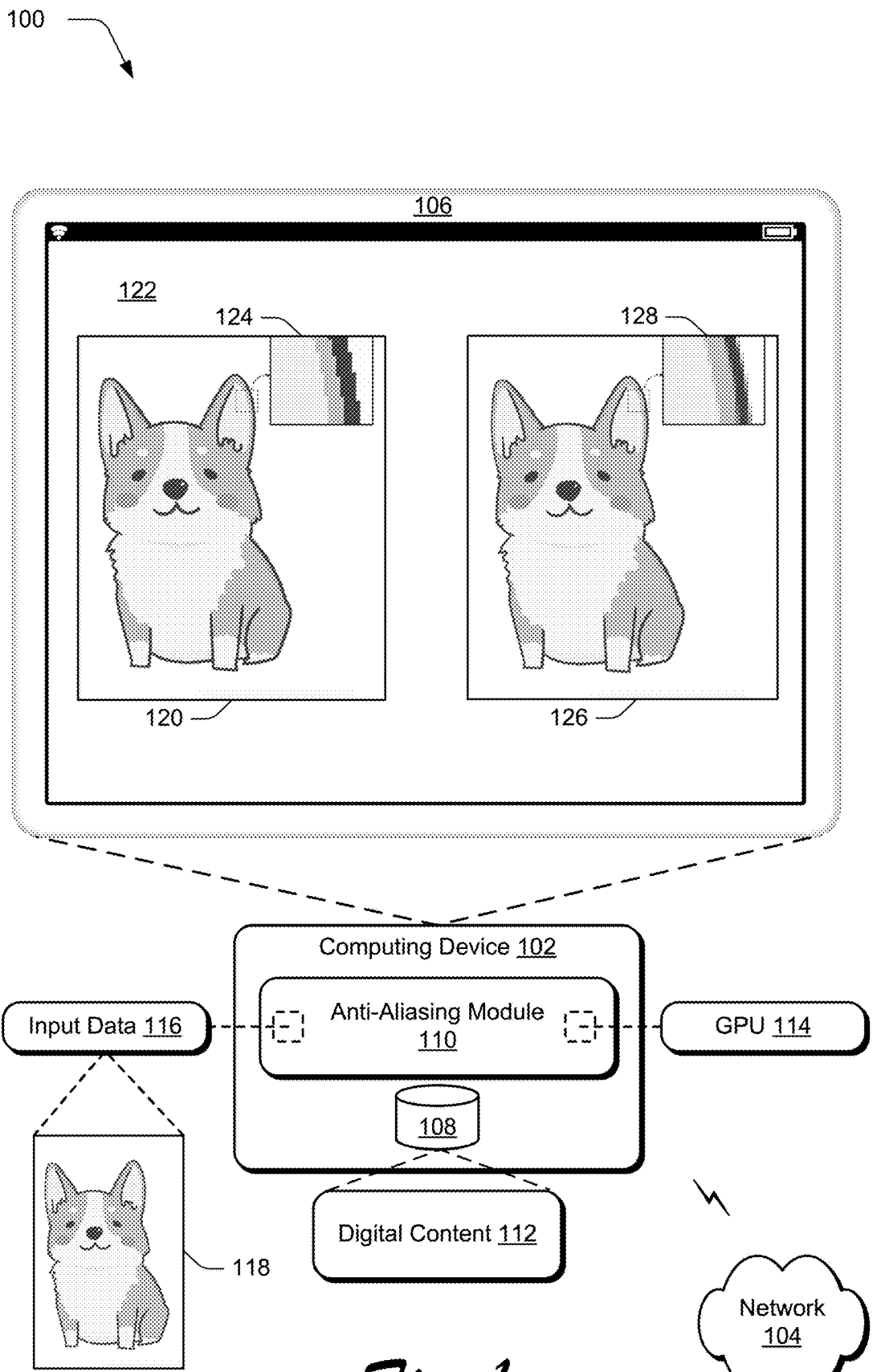
FIG. 1 is an illustration of an environment in an example implementation that is operable to employ digital systems and techniques for generating anti-aliased vector objects as described herein.

Conventional anti-aliasing systems such as supersampling systems generate graphic objects with edges that appear smooth by sampling multiple colors within pixels of the objects. These systems compute average color values from the multiple samples and apply the average color values to edge pixels of the objects such that edges of the graphic objects appear natural when rendered and displayed. However, this supersampling is computationally expensive and degrades system performance when displaying graphic objects on a display device with a high resolution such as a 4K resolution. In order to overcome the limitations of conventional anti-aliasing systems, techniques and systems are described for generating anti-aliased vector objects.

In one example, a computing device implements an anti-aliasing system to receive input data describing a Bezier curve (e.g., a cubic Bezier curve) of a vector object. The anti-aliasing system generates an aliased curve by rasterizing the Bezier curve in a pixel space having pixels including intersected pixels that are intersected by the aliased curve and non-intersected pixels that are not intersected by the aliased curve. The anti-aliasing system segments the pixels into segments in a virtual space. In an example, the segments have a higher density than the pixels such that each pixel includes multiple segments. In this example, the segments include intersected segments that are intersected by the aliased curve and non-intersected segments that are not intersected by the aliased curve.

The anti-aliasing system maps the segments from the virtual space to the pixel space using a coordinate system that defines positions in the virtual space and corresponding positions in the pixel space. In this manner, the anti-aliasing system organizes the segments into groups of segments that map to a same pixel in the pixel space. The anti-aliasing system determines whether any segments map to a same position in the virtual space, and if two segments are identified as mapping to the same position in the virtual space, then the anti-aliasing system marks one segment of the two segments as a redundant segment.

After organizing the segments into the groups that map to the same pixel and marking redundant segments, the anti-aliasing system launches a compute kernel for each segment which is not marked as redundant. In an example, these kernels are leveraged to identify one unique segment in each intersected pixel of the pixels by comparing mapped positions in the pixel space for the organized segments. For example, a unique segment of a particular intersected pixel is a last segment included in the particular intersected pixel in a scanline order.

Since each intersected pixel includes one unique segment, a total number of the unique segments corresponds to a number of unique pixels. The anti-aliasing system uses the unique segments to identify unique pixels in the pixel space which are boundary pixels of the aliased curve. In one example, the anti-aliasing system uses the unique segments and the corresponding unique pixels to identify horizontal scanline segments which form an interior of the aliased curve.

To do so in one example, the anti-aliasing system identifies the intersected segments that are intersected by the aliased curve in the virtual space. For example, the anti-aliasing system determines a first winding number for each intersected segment in the virtual space and a second winding number for each intersected segment in the pixel space. To determine the first winding number for a particular intersected segment, the anti-aliasing system identifies a direction of a portion of the aliased curve that intersects the particular intersected segment in the virtual space. Based on this direction, the anti-aliasing system identifies an initial intersection point and a final intersection point between the portion of the aliased curve and the particular intersected segment.

For example, the anti-aliasing system compares coordinates of the initial and final intersection points with corresponding coordinates of a center point of the particular intersected segment to determine whether the portion of the aliased curve crosses the center point. If the portion of the aliased curve does not cross the center point, then the anti-aliasing system determines that the first winding number is 0 for the particular intersected segment. If the portion of the aliased curve does cross the center point, then the anti-aliasing system determines that the first winding number is either 1 or −1 for the particular intersected segment based on the direction and the coordinate system.

In order to determine the second winding number for the particular intersected segment, the anti-aliasing system first maps the particular intersected segment from the virtual space to a particular intersected pixel in the pixel space. In one example, the anti-aliasing system determines a winding number for the particular intersected pixel in the pixel space which is the second winding number for the particular intersected segment. In this example, segments in the virtual space that map to a same pixel in the pixel space have a same value for the second winding number in the pixel space. After determining the first and second winding numbers for the particular intersected segment, the anti-aliasing system determines the first and second winding numbers for each of the remaining intersected segments.

Since the segments are organized in scanline order, the anti-aliasing system generates a scanline ordered position of the intersected pixels by writing a unique position of each of the unique segments in an output buffer. For example, the anti-aliasing system also writes the second winding number in the pixel space of each of the unique segments in another output buffer. Using the intersected pixel positions and the corresponding second winding numbers in the scanline order, a prefix sum operation is performed over the second winding number memory to compute a winding number for each intersected pixel of the pixels.

For each intersected pixel, the anti-aliasing system determines whether a next intersected pixel is included in a same scanline as the intersected pixel and separated from the intersected pixel by more than one pixel. If so, the anti-aliasing system stores a position of the next intersected pixel and determines whether the winding number for the intersected pixel follows a fill rule for the aliased curve. If the winding number for the intersected pixel follows the fill rule, then the anti-aliasing system determines that the intersected pixel is a beginning of a horizontal scanline segment and marks the pixels included in the horizontal scanline segment using the stored position of the next intersected pixel. The anti-aliasing system repeats this process until all horizontal scanline segments are identified and marked.

After identifying the unique pixels which are the boundary pixels of the aliased curve and identifying the horizontal scanline segments which form the interior of the aliased curve, the anti-aliasing system determines which segments included in each intersected pixel are in a fill region of the aliased curve. To do so, the anti-aliasing system accesses the first winding numbers determined for the intersected segments in the virtual space and performs a prefix sum operation over this memory to compute a winding number at every segment included in each intersected pixel. In this memory, because the intersected pixels are arranged in the order of their rendered layout (e.g., ordered by a y-coordinate and then ordered by an x-coordinate if the y-coordinate is unchanged), a prefix sum of the first winding numbers computed for the intersected segments in the virtual space results in a correct winding number at any segment included in an intersected pixel. Using the fill rule of the aliased curve and the winding numbers at the segments included in the intersected pixels, the anti-aliasing system determines whether a particular segment is included in a fill region (e.g., a shape bounded by the aliased curve) or outside of the fill region.

After determining which segments included in the intersected pixels are in the fill region, the anti-aliasing system computes a coverage mask for the pixels described by the input data. To do so, the anti-aliasing system allocates a buffer for winding numbers and writes a winding number of every segment included in the unique pixels to the buffer for winding numbers. The anti-aliasing system also allocates a buffer for coverage and copies winding numbers included in the buffer for winding numbers into the buffer for coverage. In an example, a kernel is launched for each intersected segment that identifies a position in the buffer for coverage based on a position of each intersected segment and writes a 1 at that byte location in the buffer for coverage.

The anti-aliasing system also launches a kernel for each horizontal scanline segment and boundary pixel to determine alpha values. For each kernel that maps to a horizontal scanline segment, the anti-aliasing system uses 1 as an alpha value. For each kernel that maps to a boundary pixel, the anti-aliasing system reads a coverage mask from the buffer for coverage and computes an alpha value based on the coverage mask. In one example, the anti-aliasing system computes an alpha value for a particular boundary pixel based on a number of segments included in the particular boundary pixel. Finally, color values of the aliased curve generated by rasterizing Bezier curve described by the input data are multiplied by the alpha values to generate an anti-aliased curve for display in a user interface of a display device.

Since this anti-aliased curve is generated using the intersected segments, the described systems are capable of generating anti-aliased vector objects using substantially less memory than conventional systems that generate anti-aliased vector objects using supersampling techniques. This also improves computational performance of the described systems relative to the conventional systems. In several real world examples, the described systems generate anti-aliased vector objects that are visually similar to anti-aliased vector objects generated using conventional systems in a fraction of the time required by the conventional systems. For example, the described systems process the real world examples to generate the anti-aliased vector objects between 3.9 and 9.5 faster than the conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For example, the display device 106 is an ultra-high-definition display device having a display resolution of 4K, 5K, 8K, etc. The computing device 102 includes a storage device 108 and an anti-aliasing module 110. The storage device 108 is illustrated to include digital content 112. Examples of digital content 112 include digital images, digital videos, raster objects, vector objects, and so forth.

The anti-aliasing module 110 and/or the computing device 102 are illustrated as having and/or accessing a graphics processing unit (GPU) 114. In an example, the computing device 102 includes the GPU 114 in addition to a central processing unit (CPU). In another example, the GPU is available to the computing device 102 and the anti-aliasing module 110 via the network 104. Although the GPU 114 is illustrated as a single GPU 114, it is to be appreciated that the GPU 114 is representative of multiple GPUs 114 in some examples. For example, the computing device 102 and the anti-aliasing module 110 leverage the GPU 114 (e.g., GPU 114 computing kernels) for processing and rendering digital content 112 and/or for processing data in series or parallel with the CPU such as in a CPU-GPU 114 framework. In one example, this includes leveraging multiple CPUs and/or multiple GPUs 114.

The anti-aliasing module 110 is illustrated as receiving, having, and/or transmitting input data 116. The input data 116 describes a vector object 118 defined by lines and Bezier curves (e.g., cubic Bezier curves). In one example, the input data 116 describes a Bezier curve of the vector object 118. In another example, the input data 116 describes a vector path that is defined by lines and Bezier curves.

The anti-aliasing module 110 receives the input data 116 and processes the input data 116 to generate an aliased object 120 which is displayed in a user interface 122 of the display device 106. For example, the anti-aliasing module 110 generates the aliased object 120 by rasterizing the vector object 118 in a pixel space. In an example, the anti-aliasing module 110 generates an aliased curve by rasterizing a Bezier curve of the vector object 118 in the pixel space. In this example, pixels of the pixel space include intersected pixels that are intersected by the aliased curve and non-intersected pixels that are not intersected by the Bezier curve.

In the illustrated example, the aliased object 120 includes aliased curve segments 124 which are depicted at a higher magnification than other portions of the aliased object 120 to illustrate an aliased appearance of the aliased curve segments 124. As shown, the aliased curve segments 124 appear "jagged" and are not aesthetically pleasing. This is a result of rasterizing the vector object 118 in the pixel space which converts the lines and Bezier curves defining the vector object 118 into pixels which now define the aliased object 120.

The anti-aliasing module 110 processes data describing pixels of the aliased object 120 to generate an anti-aliased object 126 which is also displayed in the user interface 122 of the display device 106. To do so in one example, the anti-aliasing module 110 segments the pixels of the aliased object 120 in a virtual space such that the segments have a higher density than the pixels. For example, the aliased object 120 is defined by pixels in the pixel space and the anti-aliasing module 110 segments these pixels into a number of segments in the virtual space. The number of segments included in each pixel of the aliased object 120 is based on a supersampling factor. In an example, the number of segments included in each pixel of the aliased object 120 is equal to the supersampling factor squared. Thus, for a supersampling factor of 4, each pixel of the aliased object 120 is segmented into 16 segments, for example, 16 segments of equal size.

Consider an example in which the anti-aliasing module 110 processes the data describing the pixels of the aliased object 120 with respect to one aliased curve (e.g., one of the aliased curve segments 124) of the aliased object 120. In this example, the one aliased curve intersects some pixels in the pixel space and also intersects some segments of the intersected pixels in the virtual space. Similarly, the one aliased curve does not intersect some pixels in the pixel space and also does not intersect some segments of the intersected pixels in the virtual space.

The anti-aliasing module 110 identifies the intersected segments that are intersected by the one aliased curve in the virtual space and maps the intersected segments to their corresponding pixels in the pixel space. For example, the anti-aliasing module 110 defines a coordinate system and leverages the coordinate system to map between coordinates in the virtual space and coordinates in the pixel space. The anti-aliasing module 110 then sorts the intersected segments based on the coordinate system such that all of the intersected segments which belong to a particular pixel of the aliased object 120 are grouped together after the sorting. In one example, the anti-aliasing module 110 uses the GPU 114 for sorting the intersected segments.

The anti-aliasing module 110 then identifies unique segments from the sorted intersected segments such that each intersected pixel includes one unique segment. To do so, the anti-aliasing module 110 launches a compute kernel for each intersected segment of the sorted intersected segments and uses the coordinate system and a scanline order to identify a last intersected segment included in each of the intersected pixels as a unique segment. For example, by proceeding in the scanline order for each intersected pixel, the anti-aliasing module 110 compares positions of consecutive intersected segments by mapping both of the consecutive intersected segments to the pixel space.

If the positions are the same (e.g., the positions map to a same intersected pixel of the aliased object 120), then the anti-alias module 110 marks a 0 in a list of unique segments. If these positions are not the same, then the anti-alias module 110 marks a 1 in the list of unique segments. An inclusive sum of the list of unique segments results in a value that is equal to a number of unique pixels.

For example, the anti-aliasing module 110 identifies unique pixels by mapping the unique segments to the pixel space. These unique pixels are boundary pixels of the one aliased curve. The anti-aliasing module 110 leverages the unique segments and corresponding unique pixels to identify horizontal scanline segments or spans which form an interior of the one aliased curve.

Continuing the previous example, the anti-aliasing module 110 identifies the horizontal scanline segments or spans because these are groups of consecutive pixels which are capable of including pixels that are enclosed by the one aliased curve. To do so, the anti-aliasing module 110 computes a winding number in the virtual space for each intersected segment of the intersected segments based on the coordinate system. For example, a winding number for a particular intersected segment is 0 if a portion of the one aliased curve included in the particular intersected segment does not cross a center point of the particular intersected segment. However, if the portion of the one aliased curve included in the particular intersected segment does cross the center point of the particular intersected segment, then the winding number for the particular intersected segment is −1 or 1 based on the coordinate system. The anti-aliasing module 110 assigns a value of 0, 1, or −1 to each intersected segment in the virtual space based on its winding number in the virtual space.

The anti-aliasing module 110 also computes a winding number in the pixel space for each intersected segment of the intersected segments based on a direction of a portion of the one aliased curve within the bounds of an intersected pixel in the pixel space. Thus, the winding number in the pixel space for the particular intersected segment is 1 or −1 based on a direction of a portion of the one aliased curve included a particular intersected pixel which includes the particular intersected segment. The anti-aliasing module 110 assigns a value of 0, 1, or −1 to each intersected segment in the pixel space based on its winding number in the pixel space. Accordingly, intersected segments included in a same pixel in the pixel space also have a same winding number in the pixel space.

In an example, the anti-aliasing module 110 leverages the GPU 114 to run kernels for each intersected segment. This includes kernels that write each unique segment's unique position in an output buffer resulting in scanline ordered positions (e.g., ordered by an x-coordinate) of the intersected pixels. This also includes kernels that write each unique segment's winding number in the pixel space in an output buffer resulting in scanline ordered winding numbers of the intersected pixels. With the intersected pixel position and corresponding winding number for each intersected pixel in scanline order, a prefix sum operation is run over the ordered winding number memory. Resulting values of the prefix sum operation are winding numbers for each of the intersected pixels, and the anti-alias module 110 uses the winding numbers for the intersected pixels to identify the horizontal scanline segments or spans.

For example, the anti-aliasing module 110 then uses the GPU 114 to run a kernel for each of the intersected pixels to determine whether an intersected pixel marks a beginning of a horizontal scanline segment. An intersected pixel is marked as the beginning of a horizontal scanline segment or a span if a next intersected pixel is in the scanline and is more than one pixel away from the intersected pixel and if a winding number of the intersected pixel follows a fill rule of the aliased object 120. For each intersected pixel that is a beginning of a horizontal scanline segment or a span, the anti-aliasing module 110 indicates a 1 and for each intersected pixel that is not a beginning of a horizontal scanline segment or a span, the anti-aliasing module 110 indicates a 0. The anti-aliasing module 110 also stores a position of the next intersected pixel in a buffer for each intersected pixel that is determined to be a span or a beginning of a horizontal scanline segment. The position of the next intersected pixel is used to determine how many pixels should be marked by a rendering kernel as being included in the span or the horizontal scanline segment.

Continuing this example, the anti-aliasing module 110 accesses the winding numbers computed for each of the intersected segments in the virtual space and performs a prefix sum operation over this memory to compute a winding number at every segment included each of the intersected pixels. In this memory, because the intersected pixels are arranged in the order of their layout in the aliased object 120 (e.g., ordered by a y-coordinate and then ordered by an x-coordinate if the y-coordinate is unchanged), a prefix sum of the winding numbers computed for each of the intersected segments in the virtual space results in a correct winding number at any segment included in an intersected pixel. Using the fill rule of the aliased object 120 and the winding numbers for the segments included in the intersected pixels, the anti-aliasing module 110 determines whether a particular segment is included in a fill region (e.g., a shape bounded by the one aliased curve) or outside of the fill region.

Finally, the anti-aliasing module 110 computes a coverage mask for each of the intersected pixels by allocating a buffer using the number of unique pixels. With this buffer in place, the anti-aliasing module 110 leverages the GPU 114 to launch a kernel buffer which copies the winding numbers of the segments included in the intersected pixels into a coverage buffer. The anti-aliasing module 110 then launches a kernel for each intersected segment to identify a position of each intersected segment and writes a 1 at each identified position in the coverage buffer. For example, the anti-aliasing module 110 launches a kernel for each unique pixel (e.g., each boundary pixel) and also launches a kernel for each horizontal scanline segment. Each kernel that maps to a horizontal scanline segment uses 1 as an alpha value and marks all pixels within a start point and an end point of the horizontal scanline segment. Each kernel that maps to a boundary pixel reads its corresponding coverage mask and computes an alpha value based on a number of the segments that are included in the boundary pixel. This computed alpha value is multiplied by a color value of the one aliased curve which produces an anti-aliased appearance.

The anti-aliasing module 110 repeats this process for multiple aliased curves of the aliased object 120 to generate the anti-aliased object 126. As illustrated in the environment 100, the anti-aliased object 126 includes anti-aliased curve segments 128 which are depicted at a higher magnification than other portions of the anti-aliased object 126 to illustrate an anti-aliased appearance of the anti-aliased curve segments 128. Unlike the aliased curve segments 124 which appear "jagged," the anti-aliased curve segments 128 appear smooth and aesthetically pleasing.

By generating the anti-aliased object 126 using the segments in the virtual space rather than generating the anti-aliased object 126 using the virtual space itself, the anti-aliasing module 110 reduces a memory dependence associated with a display density of the display device 106. For example, the virtual space itself is memoryless and the anti-aliasing module 110 only allocates memory for the segments in the virtual space. This achieves a significant reduction in computing resources consumed to generate the anti-aliased object 126 compared to using the virtual space to generate the anti-aliased object 126.

Figure 2:
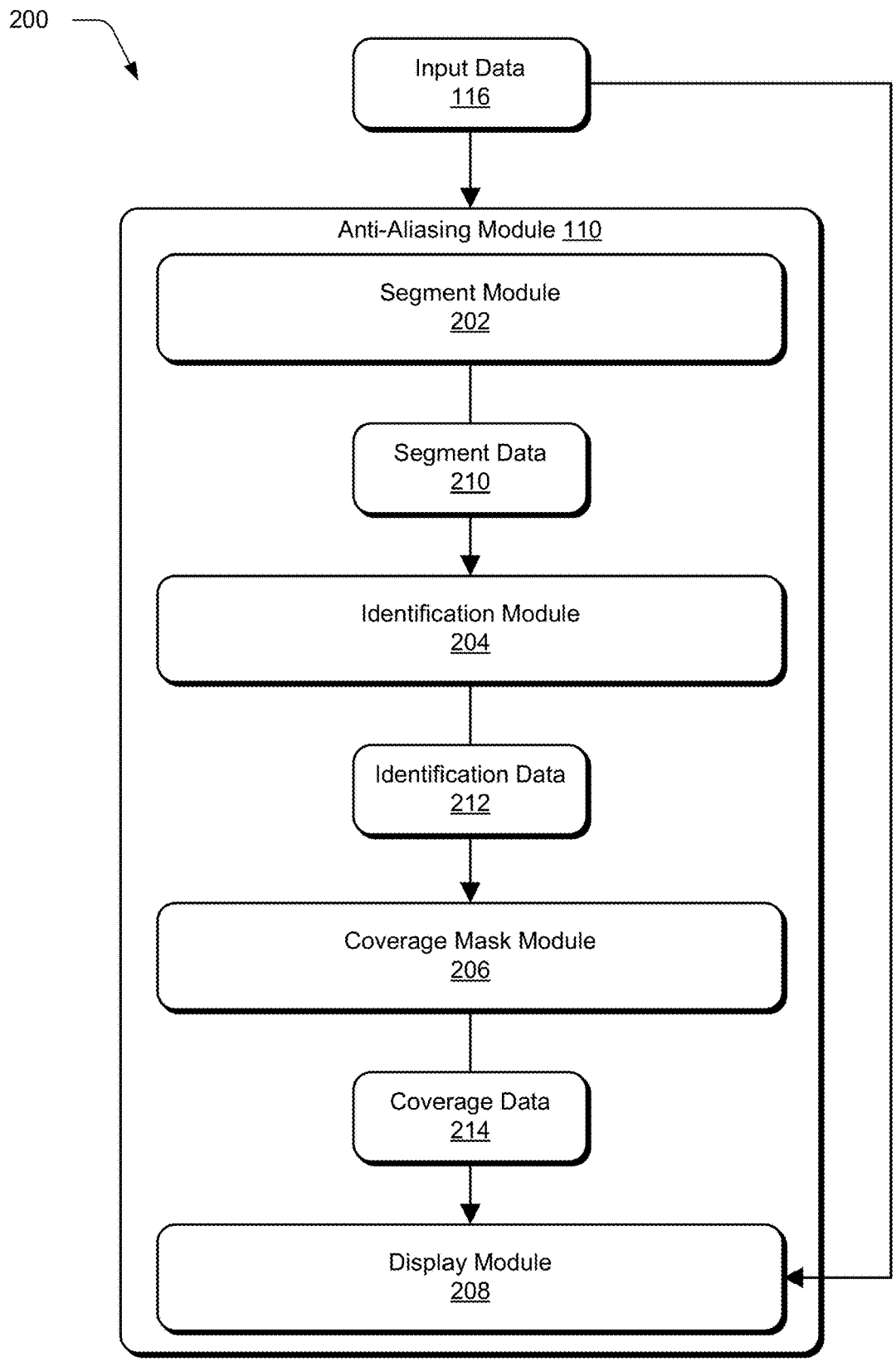
FIG. 2 depicts a system in an example implementation showing operation of an anti-aliasing module for generating anti-aliased vector objects.

FIG. 2 depicts a system 200 in an example implementation showing operation of an anti-aliasing module 110. The anti-aliasing module 110 is illustrated to include a segment module 202, an identification module 204, a coverage mask module 206, and a display module 208. As illustrated, the segment module 202 receives the input data 116 as an input and processes the input data 116 to generate segment data 210.

Figure 3A:
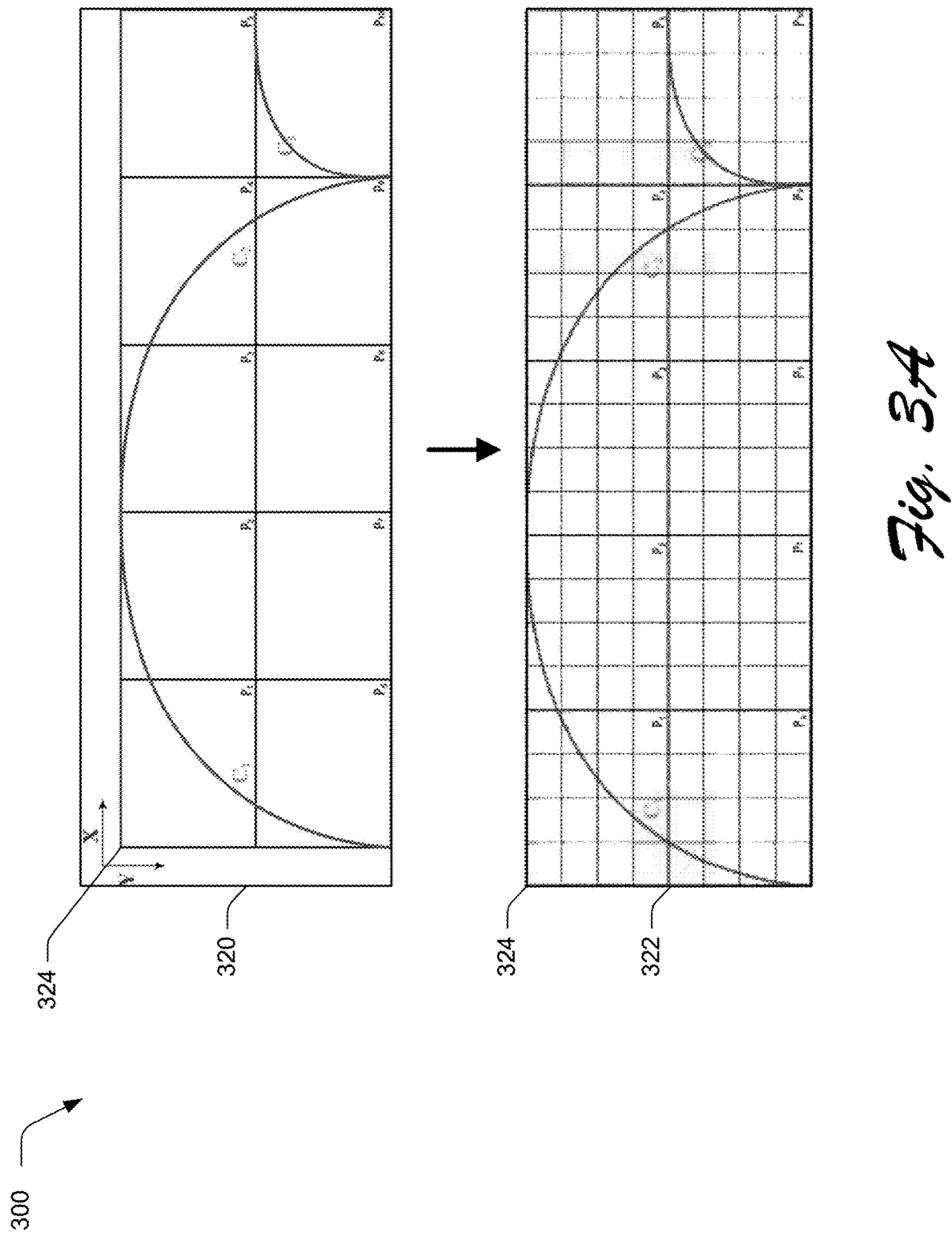
Figure 3B:
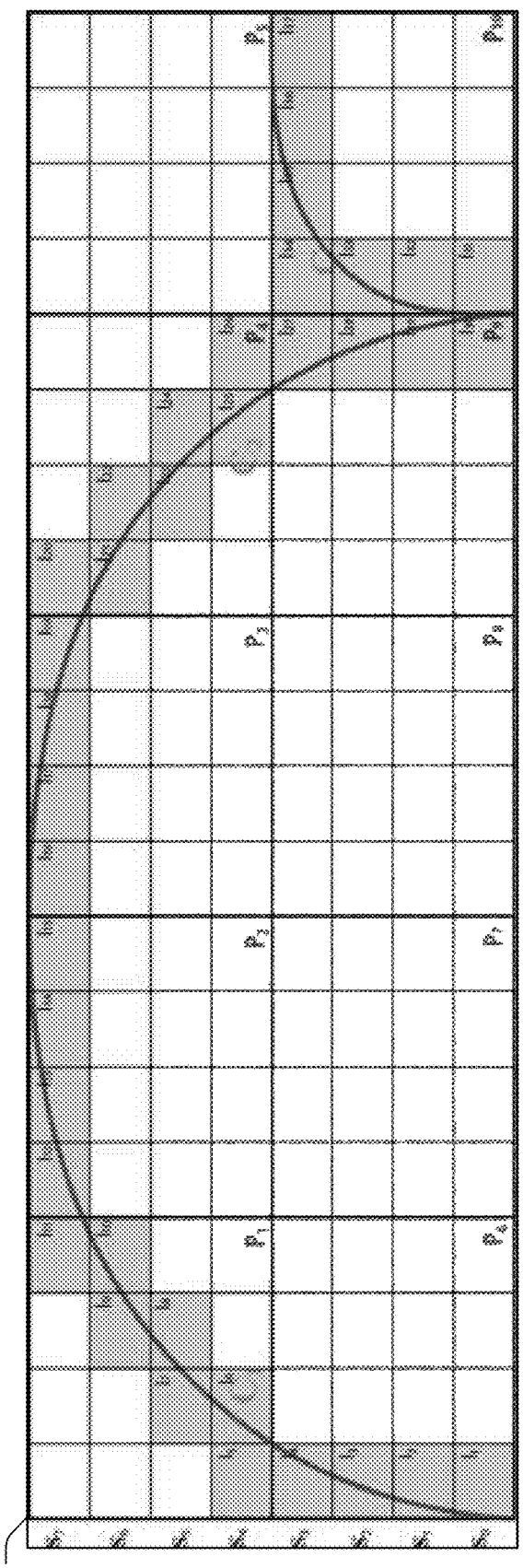
Figure 3C:
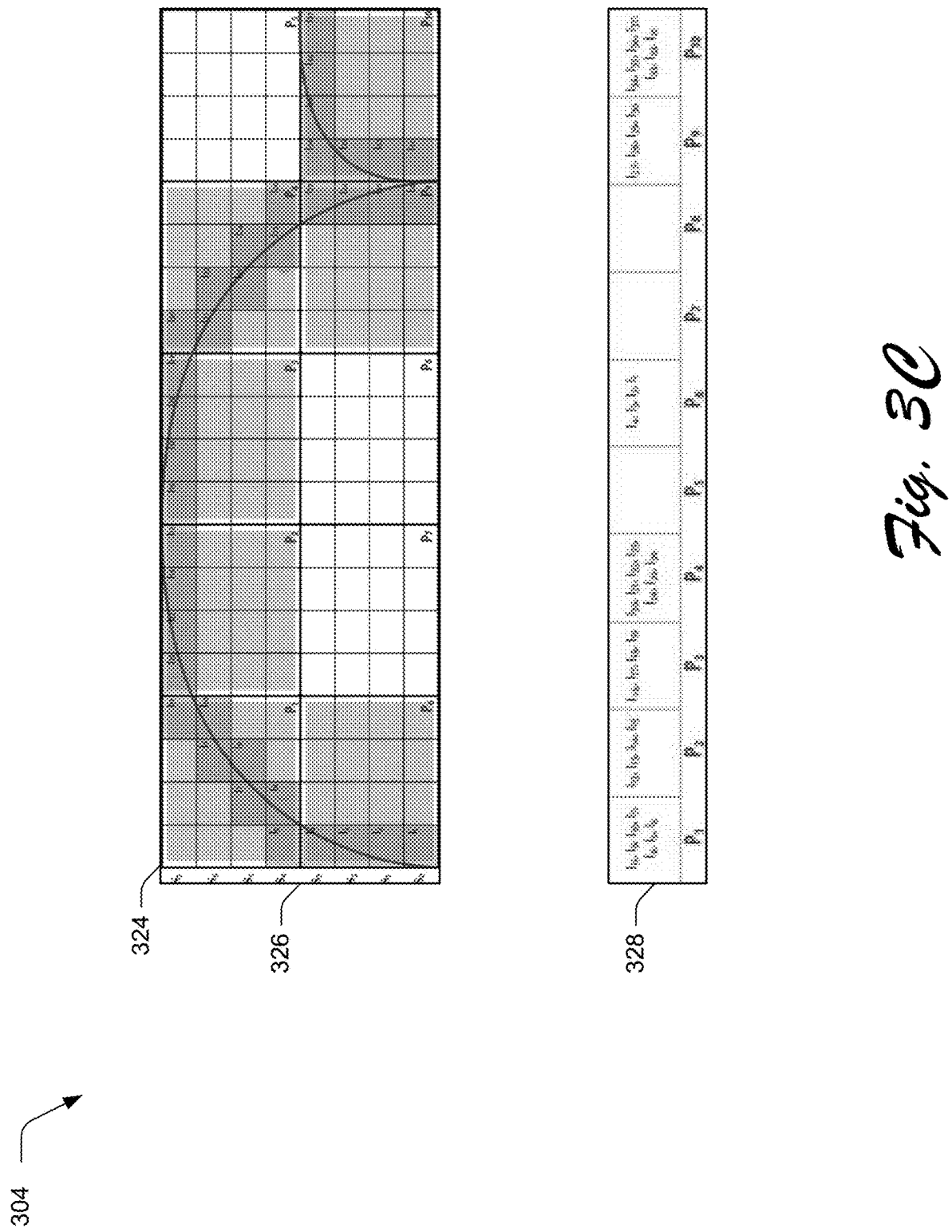
Figure 3D:
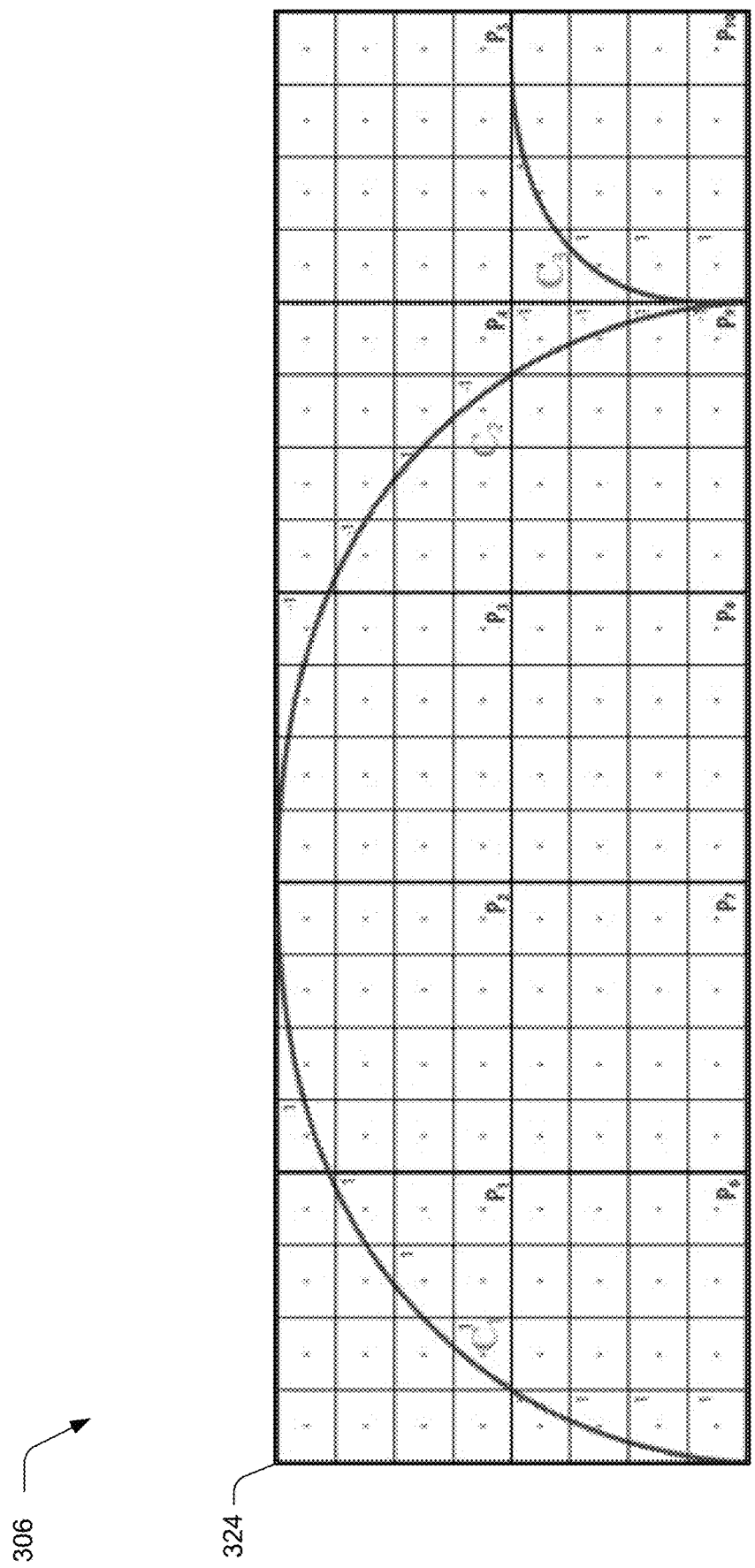
Figure 3E:
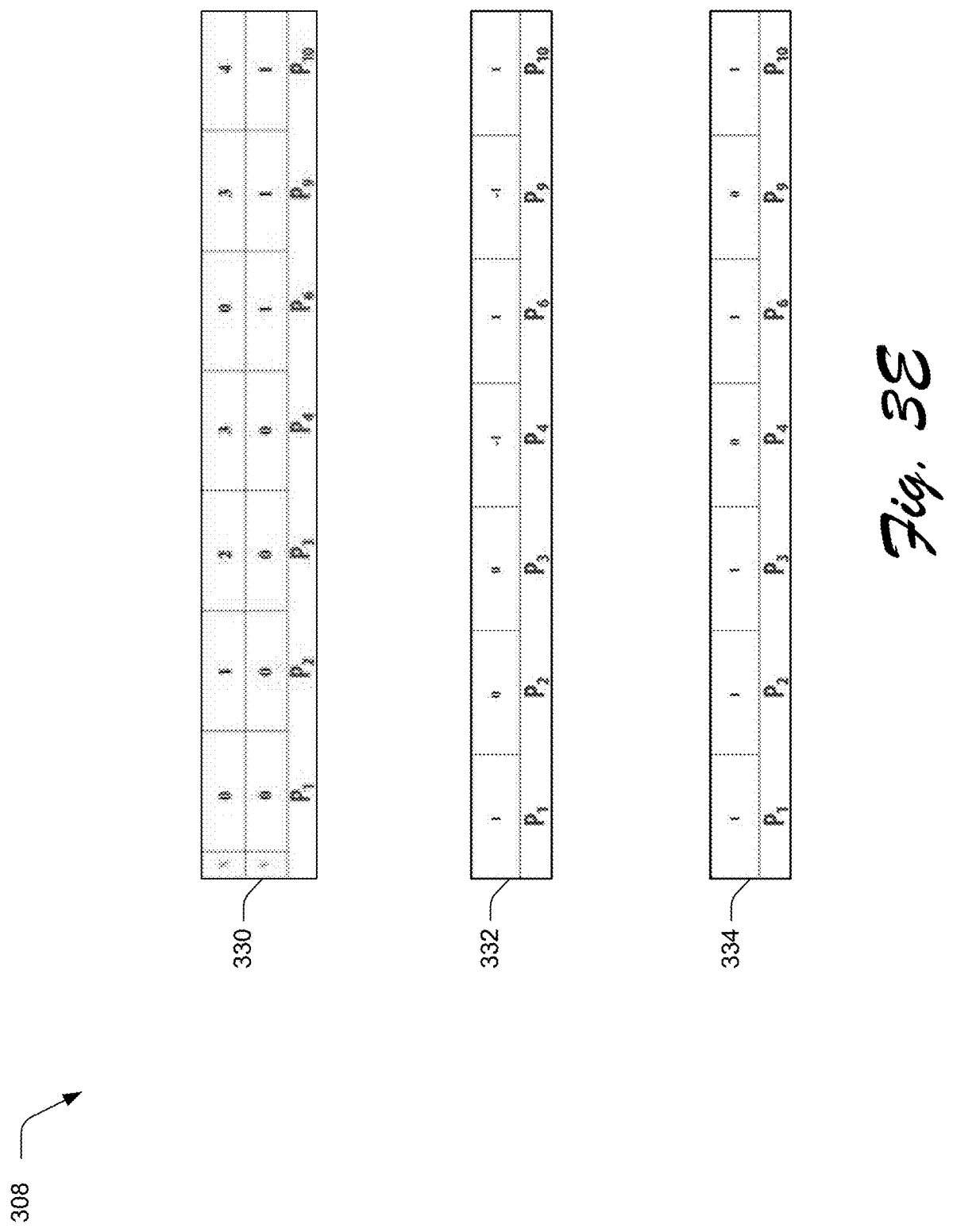
Figure 37:
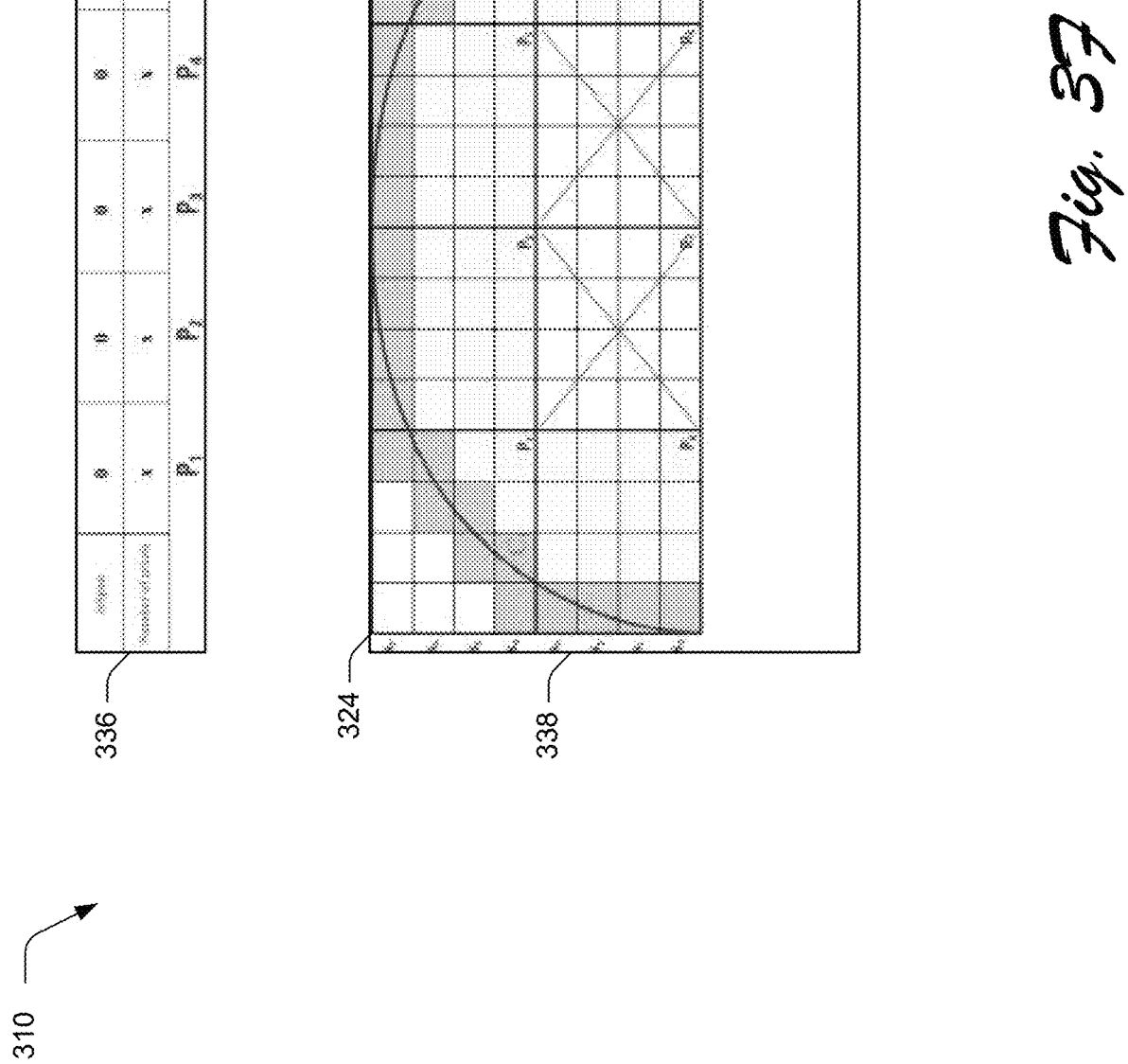
Figure 37A:
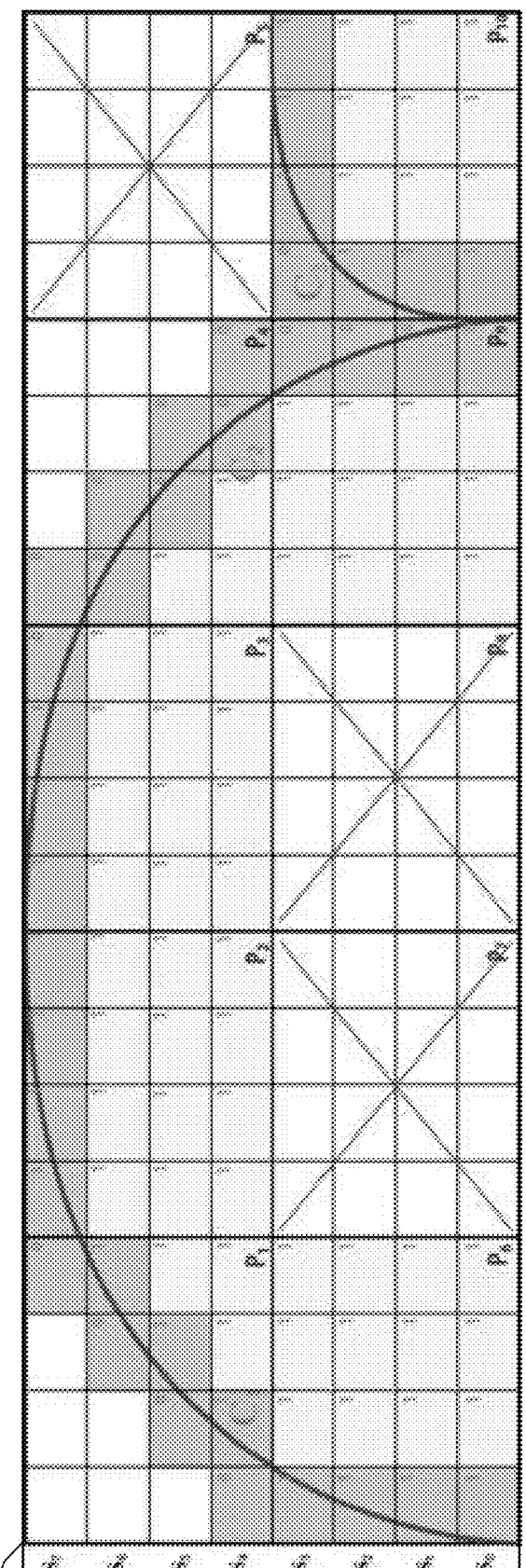
Figure 39:
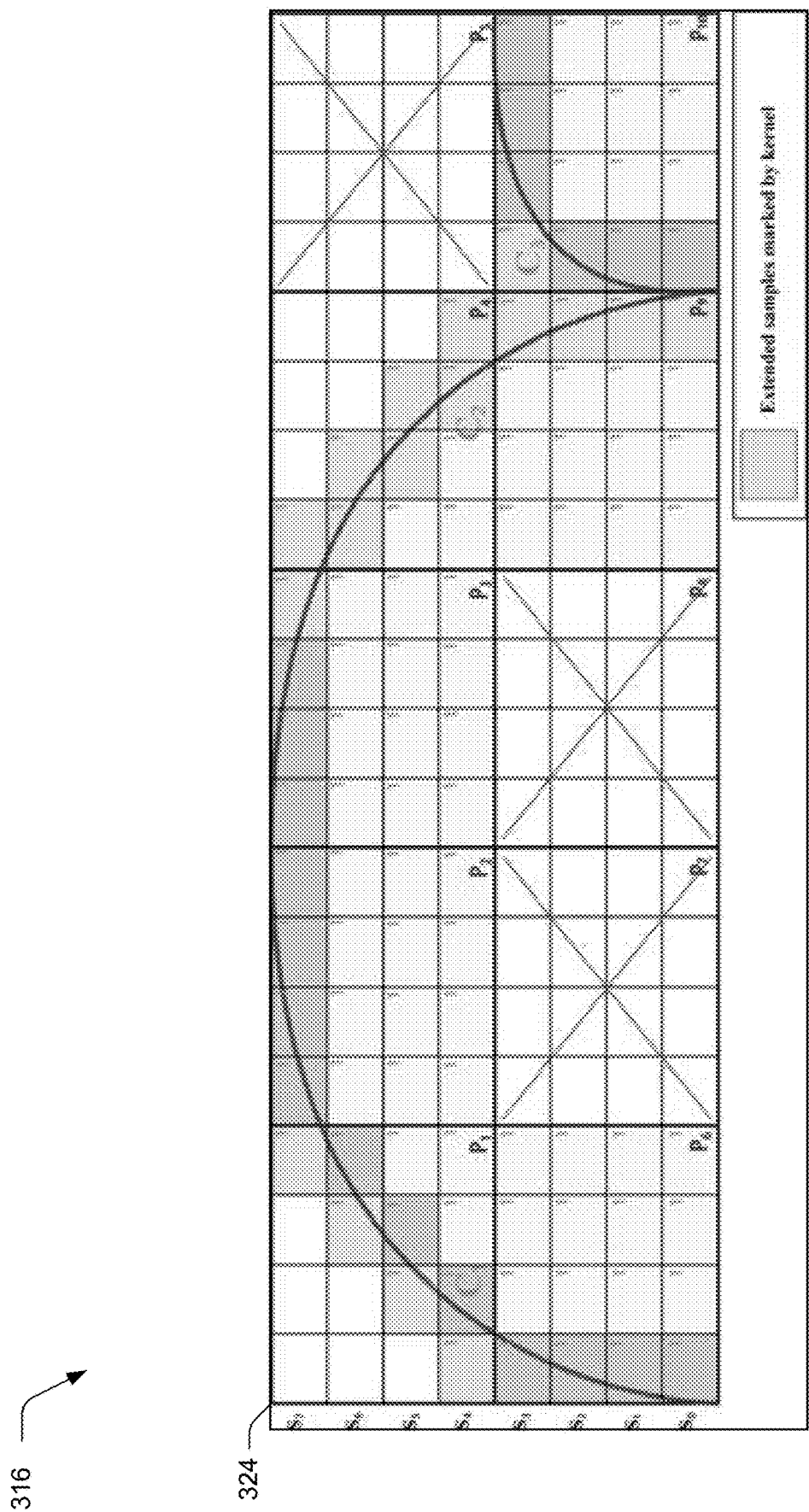
Figure 39:
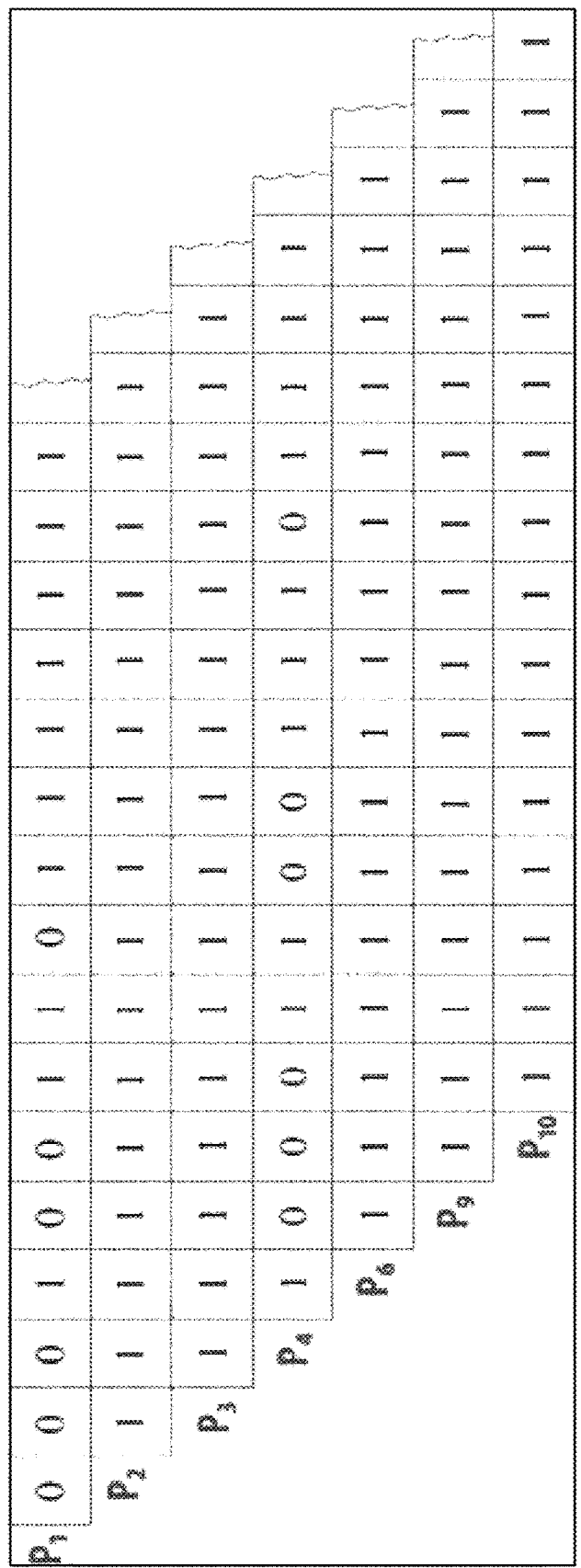

FIGS. 3A, 3B, 3C, 3D, 3E, 3F, 3G, 3H, 3I, and 3J illustrate an example of determining a coverage mask for generating an anti-aliased curve. FIG. 3A illustrates a representation 300 of received input data describing pixels in a pixel space which are segmented into segments in a virtual space. FIG. 3B illustrates a representation 302 of identified intersected segments that are intersected by portions of aliased curves. FIG. 3C illustrates a representation 304 of sorting the intersected segments. FIG. 3D illustrates a representation 306 of computed winding numbers for the intersected segments. FIG. 3E illustrates a representation 308 of pixel positions and winding numbers in a pixel space. FIG. 3F illustrates a representation 310 of an identified horizontal scanline segment. FIG. 3G illustrates a representation 312 of per segment winding numbers for segments. FIG. 3H illustrates a representation 314 of an inclusive prefix sum of winding numbers. FIG. 3I illustrates a representation 316 of a logical memory representation of coverage masks. FIG. 3J illustrates a representation 318 of an actual memory representation of the coverage masks.

As shown in FIG. 3A, the representation 300 includes pixels 320 and segmented pixels 322 which are oriented with respect to an origin 324. For example, the input data 116 describes lines and Bezier curves of a vector object such as the vector object 118. The segment module 202 receives the input data 116 and processes the input data 116 to rasterize the vector object in a pixel space that includes the pixels 320. The rasterization converts the lines and Bezier curves of the vector object into pixels defining aliased lines and aliased curves of an aliased object such as the aliased object 120.

As shown, the pixels 320 are illustrated as pixels P1-P10. The pixels 320 include intersected pixels P1, P2, P3, P4, P6, P9, and P10 which are intersected by aliased curves C1-C3.

For example, aliased curve C1 intersects pixels P1, P2, and P6; aliased curve C2 intersects pixels P3, P4, and P9; and aliased curve C3 intersects pixel P10. The pixels 320 also include non-intersected pixels P5, P7, and P8 which are not intersected by the aliased curves C1-C3.

The segment module 202 processes data describing the pixels 320 in the pixel space to segment the pixels 320 into segments in a virtual space. The segments in the virtual space have a higher density than the pixels P1-P10 such that each of the pixels P1-P10 includes multiple segments in the virtual space. For example, the input data 116 also describes a supersampling factor and the segment module 202 segments the pixels P1-P10 into a number of segments equal to the supersampling factor squared. As shown in the representation 300, the supersampling factor is equal to 4, and the segment module 202 uses matrix multiplication to scale a geometry of the pixels 320 by a factor of 4.

In one example, the segment module 202 segments the pixels 320 into the segments in the virtual space independently of the geometry of the pixels 320 by leveraging the GPU 114. In the illustrated example, the segment module 202 segments each of the pixels P1-P10 into 16 segments of equal size. For example, the segment module 202 generates the segment data 210 as describing the segmented pixels 322. In this example, the segment module 202 generates the segment data 210 as describing the segments in the virtual space rather than the virtual space itself.

With reference to FIG. 2, the identification module 204 receives the segment data 210 that describes the segmented pixels 322. The identification module 204 processes the segment data 210 to generate identification data 212. To do so, the identification module 204 identifies intersected segments that are intersected by the aliased curves C1-C3 in the virtual space. As shown in FIG. 3B, the identification module 204 identifies intersected segments I1-I37 in the virtual space. In one example, the identification module 204 identifies the intersected segments I1-I37 using horizontal lines S0-S7 by identifying portions of the aliased curves C1-C3 that intersect with segments included in each of the horizontal lines S0-S7.

As illustrated, pixel P1 includes intersected segments I5-I11 which each intersect with a portion of aliased curve C1; pixel P2 includes intersected segments I12-I15 which each intersect with a portion of aliased curve C1; pixel P3 includes intersected segments I16-I19 which each intersect with a portion of aliased curve C2; pixel P4 includes intersected segments I20-I26 which each intersect with a portion of aliased curve C2; pixel P6 includes intersected segments I1-I4 which each intersect with a portion of aliased curve C1; pixel P9 includes intersected segments I27-I30 which each intersect with a portion of aliased curve C2; and pixel P10 includes intersected segments I31-I37 which each intersect with a portion of aliased curve C3. After identifying the intersected segments I1-I37, the identification module 204 sorts or organizes the intersected segments I1-I37 in order of the aliased curves C1-C3. For example, identification module 202 organizes the intersected segments I1-I37 as I1-I15 for aliased curve C1, I16-I30 for aliased curve C2, and I31-I37 for aliased curve C3.

After sorting or organizing the intersected segments I1-I37 in order of the aliased curves C1-C3, the identification module 204 identifies segments in the virtual space that correspond to a same one of the pixels P1-P10 in the pixel space. For example, the identification module 204 maps the segments in the virtual space to the pixels P1-P10 in the pixel space. In an example, this mapping is representable as:

$$P_x = \frac{V_x}{X}; P_y = \frac{V_y}{Y}$$

where: $P_x$, $P_y$ are coordinates of a position in the pixel space; $V_x$, $V_y$ are coordinates in the virtual space; and X, Y are coordinates of a position with respect to the origin 324.

As illustrated in FIG. 3C, the representation 304 includes mapped segments 326 which accumulates all possible segments that map to one of the pixels P1-P4, P6, P9, and P10 by sorting the segments based on $P_x$, $P_y$. The representation 304 also includes a memory representation 328 which depicts the intersected segments I1-I37 organized into corresponding pixels P1-P4, P6, P9, and P10. In one example, the memory representation 328 is for illustration purposes only and the identification module 202 generates an actual memory representation of the intersected segments I1-I37 as I11, I9, I10, I7, I8, I5, I6, I12, I13, I14, I15, I16, I17, I18, I20, I21, I22, I23, I24, I25, I26, I4, I3, I2, I1, I27, I28, I29, I30, I34, I35, I36, I37, I33, I32, I31.

In the representation 304, the aliased curves C1-C3 do not overlap a same one of the pixels P1-P10. In an example in which the aliased curves C1-C3 are overlapping, the identification module 204 sorts or organizes the segments for overlapping sets of the aliased curves C1-C3 individually. In this example, segments which map to a same pixel of the pixels P1-P10 but which belong to different aliased curves C1-C3 are not merged together.

The identification module 204 leverages the mapped segments 326 to identify duplicate ones of the intersected segments I1-I37 that have a same position in the virtual space. In the representation 304, none of the intersected segments I1-I37 has a same position as another one of the intersected segments I1-I37 in the virtual space. However, in an example in which some of the intersected segments I1-I37 map to a same position in the virtual space, the identification module 204 marks duplicate ones of the intersected segments I1-I37 and ignores any marked segments in further processing and/or operations. This is because the identification module 204 is implemented to consider each of the intersected segments I1-I37 one time.

After marking any duplicate ones of the intersected segments I1-I37, the identification module 204 leverages the GPU 114 and launches a compute kernel for each of the intersected segments I1-I37 to identify unique segments. For example, each of the intersected pixels P1-P4, P6, P9, P10 includes one unique segment. In each of the kernels, the identification module 204 compares a position of a corresponding intersected segment to a position of a previous intersected segment in the list I11, I9, I10, I7, I8, I5, I6, I12, I13, I14, I15, I16, I17, I18, I20, I21, I22, I23, I24, I25, I26, I4, I3, I2, I1, I27, I28, I29, I30, I34, I35, I36, I37, I33, I32, I31.

For example, by proceeding in the scanline order for each intersected pixel of the intersected pixels P1-P4, P6, P9, P10, the identification module 204 compares positions of consecutive intersected segments by mapping both of the consecutive intersected segments to the pixel space. If the positions are the same (e.g., the positions map to a same intersected pixel), then the identification module 204 marks a 0 in a list of unique segments. If these positions are not the same, then identification module 204 marks a 1 in the list of unique segments. By marking the list of unique segments in this manner, the identification module 204 identifies the unique segments as I6, I15, I19, I26, I1, I30, and I37. As illustrated, the unique segments I6, I15, I19, I26, I1, I30, I37 are each a last intersected segment included in one of the intersected pixels P1-P4, P6, P9, P10 in scanline order.

The identification module 204 uses the list of unique segments to identify a number of unique pixels. For example, the identification module 204 generates the list of unique segments as 0, 0, 0, 0, 0, 0, 0, 1, 0, 0, 0, 1, 0, 0, 0, 1, 0, 0, 0, 0, 0, 0, 1, 0, 0, 0, 1, 0, 0, 0, 1, 0, 0, 0, 0, 0. In one example, an inclusive sum of the list of unique segments is equal to the number of unique pixels. In this example, the identification module 204 outputs a result of the inclusive prefix sum as 0, 0, 0, 0, 0, 0, 0, 1, 1, 1, 1, 2, 2, 2, 2, 3, 3, 3, 3, 3, 3, 3, 4, 4, 4, 4, 5, 5, 5, 5, 6, 6, 6, 6, 6, 6, 6. The identification module 204 extracts the first and last values of the prefix sum as 0 and 6, respectively, and determines that there are 7 unique pixels.

The identification module 204 identifies the unique pixels by mapping the unique segments I6, I15, I19, I26, I1, I30, I37 from the virtual space to the pixel space. In this example, the unique pixels are P1-P4, P6, P9, P10 (which are the same pixels as the intersected pixels P1-P4, P6, P9, P10). These unique pixels P1-P4, P6, P9, P10 are boundary pixels for the aliased curves C1-C3. The identification module 204 leverages the unique pixels P1-P4, P6, P9, P10 to identify horizontal scanline segments or spans. For example, the identification module 204 identifies the horizontal scanline segments or spans because these are groups of consecutive pixels which are capable of including pixels enclosed by one of the aliased curves C1-C3.

To do so in one example, the identification module 204 determines a winding number for each of the intersected segments I1-I37 in the virtual space and also determines a winding number for each of the intersected segments I1-I37 in the pixel space. The identification module 204 uses the winding number for each of the intersected segments I1-I37 in the pixel space to compute a winding number at each of the intersected pixels P1-P4, P6, P9, P10. For example, the identification module 204 then uses the winding number at each of the intersected pixels P1-P4, P6, P9, P10 to identify the horizontal scanline segments or spans. The identification module 204 uses the winding number for each of the intersected segments I1-I37 in the virtual space to compute a winding number at every segment included in each of the intersected pixels intersected pixels P1-P4, P6, P9, P10. In one example, the identification module 204 then uses the winding number of every segment included in each of the intersected pixels P1-P4, P6, P9, P10 to identify which of the segments are included in a fill region for one of the aliased curves C1-C3.

The representation 306 of FIG. 3D illustrates the determined winding numbers for the intersected segments I1-I37 in the virtual space. To compute a winding number in the virtual space for a particular intersected segment, the identification module 204 first determines a direction of a portion of a particular aliased curve of the aliased curves C1-C3 that intersects the particular intersected segment using the coordinate system defined relative to the origin 324. For example, the identification module 204 uses the determined direction to identify an initial intersection point and a final intersection point between the portion of the particular aliased curve and the particular intersected segment.

The identification module 204 compares the identified initial and final intersections points to a center point of the particular intersected segment to determine whether the portion of the particular aliased curve crosses the center point. To do so, the identification module 204 compares a coordinate of the identified initial intersection point to a corresponding coordinate of the center point. For example, the identification module 204 determines whether a coordinate of the initial intersection point is less than a corresponding coordinate of the center point.

Consider a first example in which a y-coordinate of the initial intersection point is equal to 5 and a y-coordinate of the center point is equal to 4. In this example, the y-coordinate of the initial intersection point is not less than the y-coordinate of the center point and the identification module 204 determines that the winding number for the particular intersected segment is 0. Consider a second example in which the y-coordinate of the initial intersection point is equal to 4 and the y-coordinate of the center point is also equal to 4. As in the first example, the y-coordinate of the initial intersection point is not less than the y-coordinate of the center point and the identification module 204 determines that the winding number for the particular intersected segment is 0.

Consider a third example in which the y-coordinate of the initial intersection point is equal to 3 and the y-coordinate of the center point is equal to 4. In this third example, the y-coordinate of the initial intersection point is less than the y-coordinate of the center point. Continuing this example, the identification module 204 compares a coordinate of the identified final intersection point to a corresponding coordinate of the center point. For example, the identification module 204 determines whether a coordinate of the final intersection point is greater than a corresponding coordinate of the center point.

In an example in which a y-coordinate of the final intersection point is not greater than the y-coordinate of the center point, the identification module 204 determines that the winding number for the particular intersected segment is 0. In another example in which the y-coordinate of the final intersection point is greater than the y-coordinate of the center point, the identification module 204 determines that the portion of the particular aliased curve crosses the center point. In this example, the identification module 204 determines that the winding number for the particular intersected segment is 1 or −1 depending on the direction of the portion of the particular aliased curve. For example, if the direction of the portion of the particular aliased curve is clockwise, then the winding number for the particular intersected segment is 1. If the direction of the portion of the particular aliased curve is counterclockwise, then the identification module 204 determines that the winding number for the particular intersected segment is −1.

In some examples, rather than determining whether a coordinate of the initial intersection point is less than a corresponding coordinate of the center point, the identification module 204 determines whether the coordinate of the initial intersection point is less than or equal to the corresponding coordinate of the center point. Similarly, in some examples, the identification module 204 determines whether a coordinate of the final intersection point is greater than or equal to a corresponding coordinate of the center point. For example, the identification module 204 determines that a clockwise direction of the portion of the particular aliased curve corresponds to a winding number of −1 and a counterclockwise direction of portion the particular aliased curve corresponds to a winding number of 1.

As shown in the representation 306, the identification module 204 determines a winding number of 1 in the virtual space for intersected segments I1-I4, I6, I8, I10, I12, I31-I33, and I35; the identification module 204 determines a winding number of −1 in the virtual space for intersected segments I19, I21, I23, I25, and I27-I30; and the identification module 204 determines a winding number of 0 in the virtual space for intersected segments I5, I7, I9, I11, I13-I18, I20, I22, I24, I26, I34, I36, and I37. The identification module 204 also determines the winding number for each of the intersected segments I1-I37 in the pixel space by mapping each of the intersected segments I1-I37 to a corresponding pixel in the pixel space and determines a winding number for the corresponding pixel in the pixel space. In one example, sets of the intersecting segments I1-I37 which map to a same one of the P1-P4, P6, P9, P10 also have same winding numbers in the pixel space.

For example, the identification module 204 determines a winding number of 1 in the pixel space for intersected segments I5-I11, I1-I4, and I31-I37; the identification module 204 determines a winding number of −1 in the pixel space for intersected segments I20-I30; and the identification module 204 determines a winding number of 0 in the pixel space for intersected segments I12-I19. The identification module 204 uses the winding numbers in the pixel space to identify horizontal scanline segments or spans which correspond to groups of consecutive pixels P1-P10. Although the identification module 204 has identified the intersected pixels P1-P4, P6, P9, P10, the identification module 204 also identifies the scanline segments or spans because these include pixels within a fill area of the aliased curves C1-C3 in some examples.

As depicted in FIG. 3E, the representation 308 includes pixel positions 330. Since the segments are arranged in scanline order, the identification module 204 leverages this arrangement and runs a kernel for several operations as part of identifying the horizontal scanline segments or spans. The identification module 204 launches a kernel that writes a unique position of each of the unique segments I6, I15, I19, I26, I1, I30, I37 in an output buffer which results in scanline ordered positions of pixels illustrated by the pixel positions 330. The identification module 204 also launches a kernel that writes the winding number in the pixel space for each of the unique segments I6, I15, I19, I26, I1, I30, I37 in an output buffer resulting in scanline ordered winding numbers of pixels 332.

In one example, the identification module 204 leverages the pixel positions 330 and the scanline ordered winding numbers of pixels 332 (e.g., ordered by x-coordinates) to perform a prefix sum operation which results in an inclusive sum of prefix winding numbers 334. In this example, the identification module 204 runs a kernel for each of the pixels P1-P4, P6, P9, P10 to determine whether each of the pixels P1-P4, P6, P9, P10 marks a beginning of a horizontal scanline segment or span. For example, the identification module 204 determines that a particular one of the pixels P1-P4, P6, P9, P10 is marked as a beginning of a horizontal scanline segment or span if a next one of the pixels P1-P4, P6, P9, P10 is in a same scanline as the particular one of the pixels P1-P4, P6, P9, P10 and if the next one of the pixels P1-P4, P6, P9, P10 is more than one pixel away from the particular one of the pixels P1-P4, P6, P9, P10 and if a winding number of the particular one of the pixels P1-P4, P6, P9, P10 follows a fill rule for the aliased curves C1-C3. In some examples, the aliased curves C1-C3 follow an even-odd fill rule, a non-zero fill rule, etc.

With respect to FIG. 3F, the identification module 204 marks the particular one of the pixels P1-P4, P6, P9, P10 with a 1 if it is a span or with a 0 if it is not a span and also stores a position of the next one of the pixels P1-P4, P6, P9, P10. This stored position is used to determine how many pixels should be marked by a rendering kernel. The identification module repeats this process for each of the pixels P1-P4, P6, P9, P10 to generate span information 336.

The representation 310 includes an example 338 which illustrates segments that are mapped to boundary fragments, segments inside of one of the aliased curves C1-C3 over which coverage is required, and that no memory is allocated for pixels P5, P7, and P8. To generate the example 338, the identification module 204 allocates a buffer for storing winding numbers in the virtual space of the intersecting segments I1-I37 and leverages this buffer to generate the representation 312 illustrated in FIG. 3G. In this memory, pixels are arranged in rendered layout (e.g., ordered by y-coordinates and then by x-coordinates if the y-coordinates are unchanged). As a result of this, a prefix sum over the winding numbers illustrated in the representation 312 outputs a correct winding number of every segment included in each of the intersected pixels P1-P4, P6, P9, P10.

The identification module 204 performs a prefix sum operation of the winding numbers in the virtual space illustrated in the representation 312 over all of the segments which ensures accuracy in examples in which the aliased curves C1-C3 are overlapping and/or self-intersecting. A result of this prefix sum operation is depicted in the representation 314 illustrated in FIG. 3H. As shown, the identification module 204 uses a fill rule of the aliased curves C1-C3 and the computed winding numbers illustrated in the representation 314 to determine whether any particular one of the segments is inside of a fill region or outside of the fill region for the aliased curves C1-C3. The identification module 204 determines this for each segment illustrated in the representation 314 and generates the identification data 212 as describing a position relative to the fill region for each segment illustrated in the representation 314.

The coverage mask module 206 receives the identification data 212 and processes the identification data 212 to generate coverage data 214. To do so, the coverage mask module 206 allocates memory for a coverage buffer and launches a kernel for each position in the coverage buffer. For example, each invocation copies a winding number of the computed winding numbers illustrated in the representation 314 into the coverage buffer. The coverage mask module 206 then launches a kernel for each of the intersected segments in the list I11, I9, I10, I7, I8, I5, I6, I12, I13, I14, I15, I16, I17, I18, I20, I21, I22, I23, I24, I25, I26, I4, I3, I2, I1, I27, I28, I29, I30, I34, I35, I36, I37, I33, I32, I31 and uses the kernels to compute locations of the intersected segments. In one example, this is representable as:

$i_s = X^2 * L[i] + X * (V_x \bmod X) + (V_y \bmod X)$ where: $i_s$ is the final position in allocated memory; L[i] is the $i^{th}$ element in the list I11, I9, I10, I7, I8, I5, I6, I12, I13, I14, I15, I16, I17, I18, I20, I21, I22, I23, I24, I25, I26, I4, I3, I2, I1, I27, I28, I29, I30, I34, I35, I36, I37, I33, I32, I31; and $V_x$, $V_y$ are the positions in the virtual space.

The coverage mask module 206 writes a 1 at each of the computed locations and/or positions in the coverage buffer and generates the coverage data 214 as describing the coverage buffer. The representation 316 illustrated in FIG. 3I depicts a logical representation of the coverage data 212 and the representation 318 illustrated in FIG. 3J illustrates an actual memory representation of the coverage data 212. The display module 208 receives the coverage data 214 and the input data 116 and processes the coverage data 214 and/or the input data 116 (which represents the aliased object generated by rasterizing the vector object described by the input data 116) to generate an anti-aliased curve for display in a user interface of a display device. To do so in one example, the display module 208 renders entities including horizontal scanline segments and the intersected pixels P1-P4, P6, P9, P10 (e.g., the boundary pixels of the aliased curves C1-C3). The display module 208 launches a kernel for each horizontal scanline segment and each of the intersected pixels P1-P4, P6, P9, P10.

Each kernel that maps to a horizontal scanline segment uses 1 as an alpha value and marks all pixels within a start point and an endpoint of the horizontal scanline segment. Each kernel that maps to one of the intersected pixels P1-P4, P6, P9, P10 reads a coverage mask described by the coverage data 214 and computes an alpha value. In an example, this is representable as:

$$C_p = \sum_{i=0}^{X^2} \frac{VC_i}{X^2}$$

where: $C_p$ is coverage of a pixel on a screen of a display device; X is the supersampling factor; and $VC_i$ is the coverage for an $i^{th}$ segment generated for a pixel which is 0 or 1 from a coverage mask described by the coverage data 214.

Figure 4:
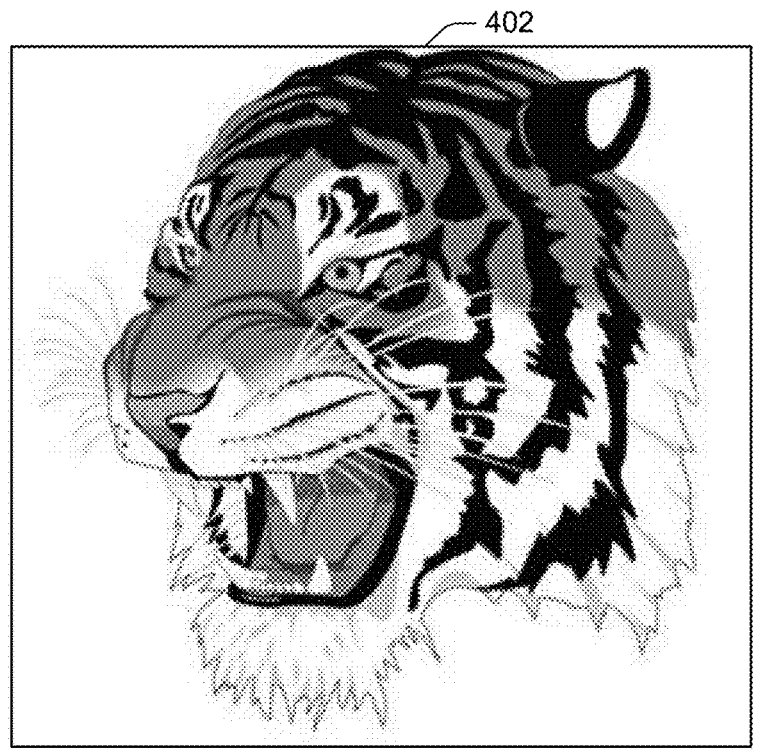
FIG. 4 illustrates an example of an anti-aliased vector object generated using systems and techniques as described herein.

The display module 208 computes the coverage and multiplies the computed coverage with a color value of one of the aliased curves C1-C3. This alpha multiplication results in an anti-aliased appearance. In this manner, the display module 208 generates an anti-aliased vector object from an input aliased vector object. FIG. 4 illustrates an example 400 of an anti-aliased vector object generated using systems and techniques as described herein. As shown, the example 400 includes an anti-aliased object 402 which includes multiple anti-aliased curves. The anti-aliased object 402 is aesthetically pleasing and the anti-aliasing module 110 generates the anti-aliased object 402 in a fraction of the time required to generate the anti-aliased object 402 using standard CPU tessellation-based GPU rendering techniques.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 5:
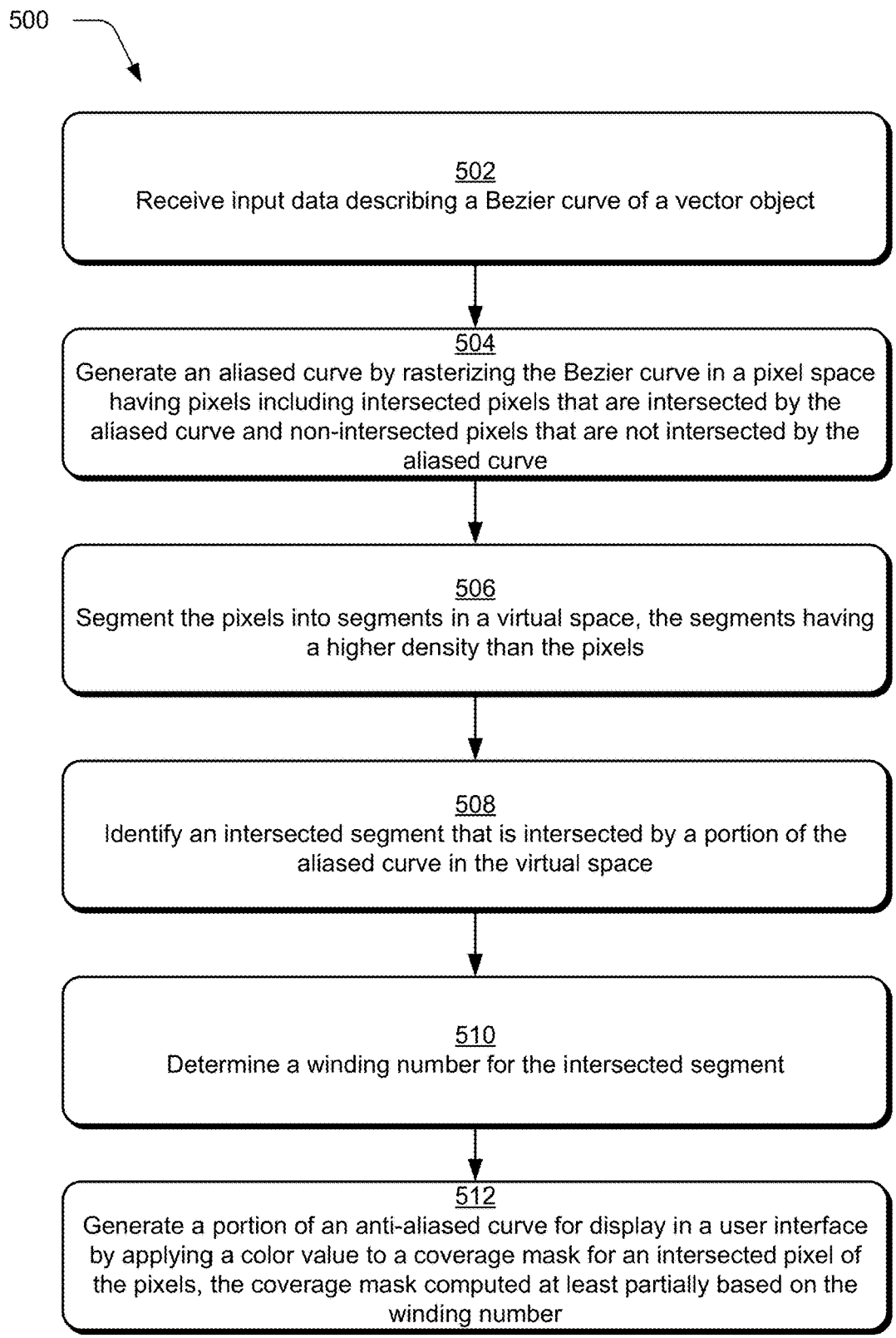
FIG. 5 is a flow diagram depicting a procedure in an example implementation in which input data describing a Bezier curve of a vector object is received and a portion of an anti-aliased curve is generated based on the input data.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4. FIG. 5 is a flow diagram depicting a procedure 500 in an example implementation in which input data describing a Bezier curve of a vector object is received and a portion of an anti-aliased curve is generated based on the input data.

Input data describing a Bezier curve of a vector object is received (block 502). In an example, the anti-aliasing module 110 receives the input data. An aliased curve is generated by rasterizing the Bezier curve in a pixel space having pixels including intersected pixels that are intersected by the aliased curve and non-intersected pixels that are not intersected by the aliased curve (block 504). For example, the computing device 102 implements the anti-aliasing module 110 to generate the aliased curve by rasterizing the Bezier curve.

The pixels are segmented into segments in a virtual space, the segments having a higher density than the pixels (block 506). In one example, the anti-aliasing module 110 segments the pixels into the segments in the virtual space. An intersected segment is identified that is intersected by a portion of the aliased curve in the virtual space (block 508). The computing device 102 implements the anti-aliasing module 110 to identify the intersected segment in one example.

A winding number is determined for the intersected segment (block 510). In an example, the anti-aliasing module 110 determines the winding number for the intersected segment. A portion of an anti-aliased curve is generated for display in a user interface by applying a color value to a coverage mask for an intersected pixel of the pixels, the coverage mask is computed at least partially based on the winding number (block 512). For example, the anti-aliasing module 110 generates the portion of the anti-aliased curve by applying the color value to the coverage mask.

Improvement Examples

Figure 6:
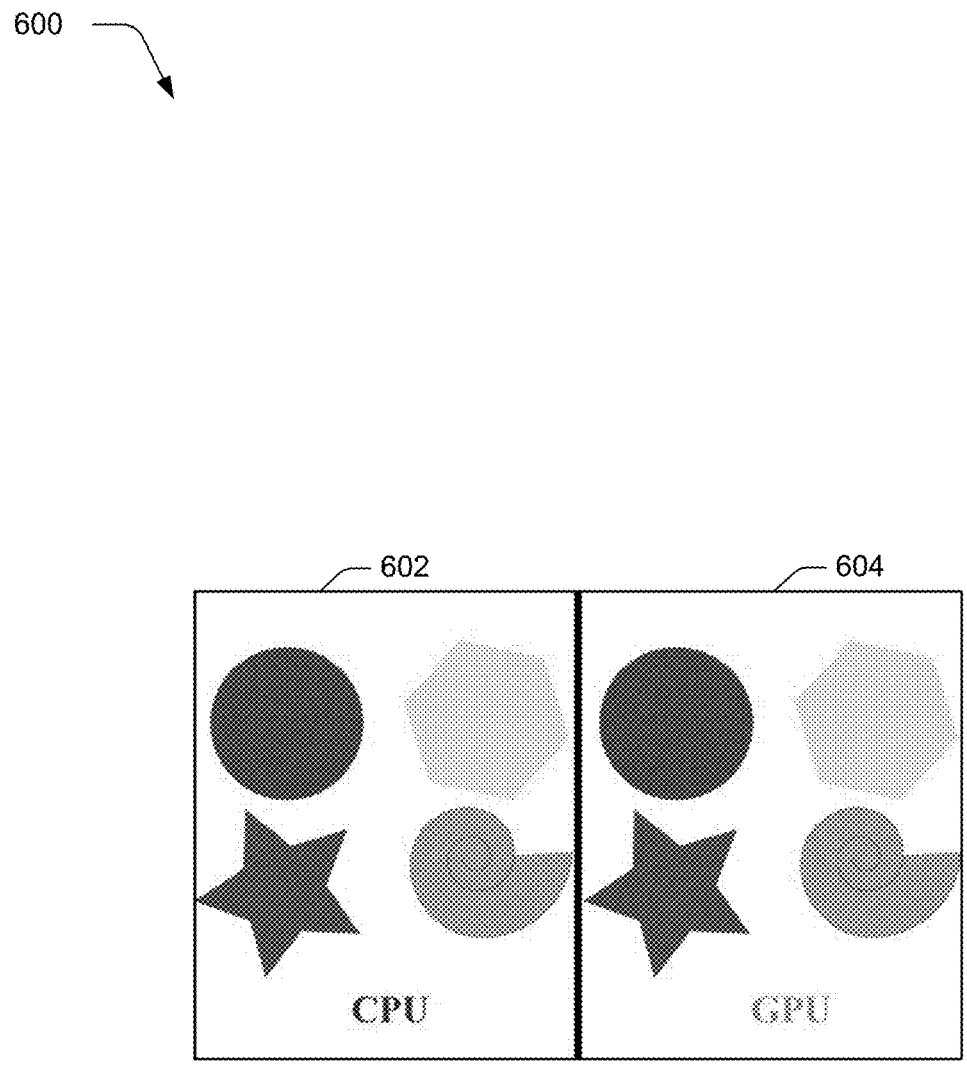
FIG. 6 illustrates a representation of multiple anti-aliased vector objects.

FIG. 6 illustrates a representation 600 of multiple anti-aliased vector objects. The representation 600 includes a first group 602 of anti-aliased objects and a second group 604 of anti-aliased objects. The first group 602 was generated using central processing unit (CPU) supersampling techniques and the second group 604 was generated using the described techniques. As shown, the first group 602 and the second group 604 are visually similar. However, the second group 604 was generated in significantly improved frame rendering time compared to the first group 602. Table 1 illustrates examples of improvements of the described systems and techniques compared to standard CPU tessellation-based graphics processing unit (GPU) rendering techniques.

TABLE 1

Frame Render Time

| Example | Conventional Techniques | Described Techniques | Gain (X) |
|---|---|---|---|
| 1 | 1410 | 362 | 3.9 |
| 2 | 237 | 42 | 5.6 |
| 3 | 4090 | 436 | 9.4 |
| 4 | 1152 | 121 | 9.5 |

As illustrated in Table 1 above, the described systems and techniques for generating anti-aliased vector objects achieve significant performance improvements relative to conventional systems. This includes improving frame rendering times by 3.9 to 9.5 times in real-world examples.

Example System and Device

Figure 7:
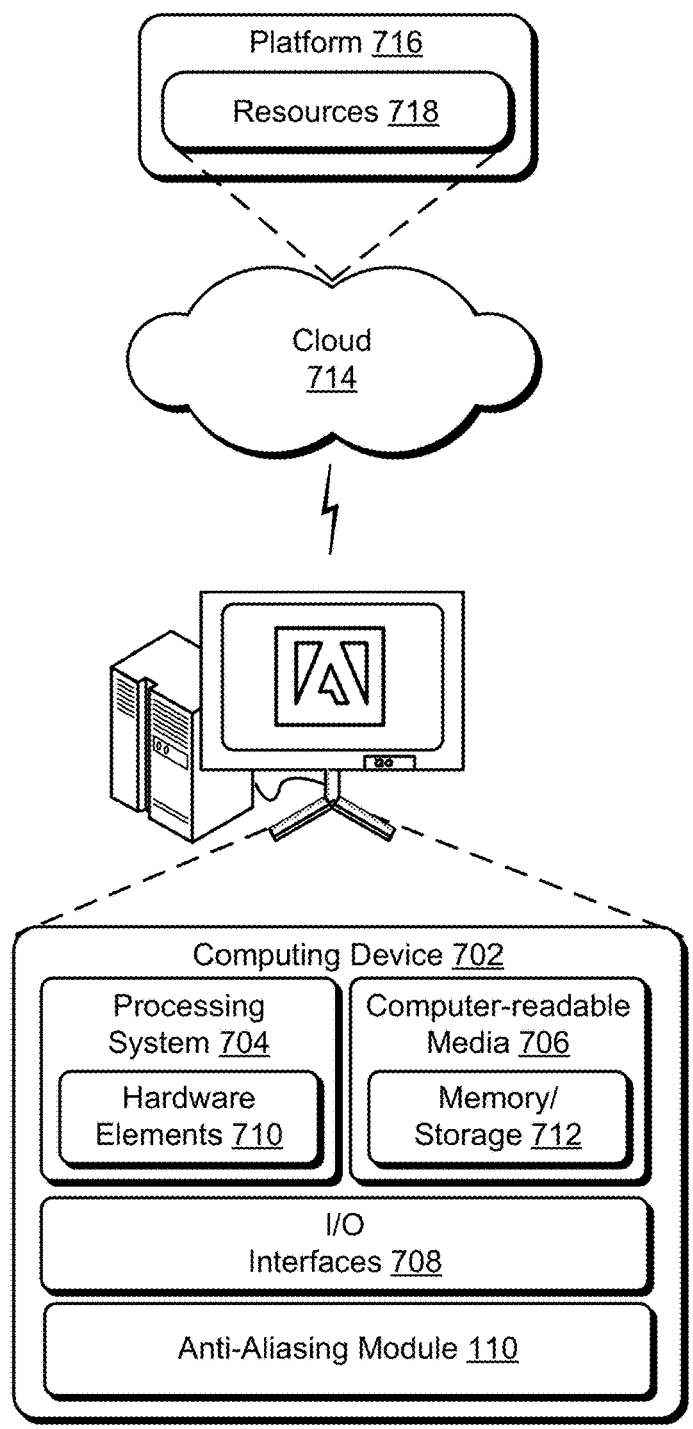
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the anti-alias module 110. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

CONCLUSION

Although implementations of systems for generating anti-aliased vector objects have been described in language specific to structural features and/or methods, it is to be understood that the appended claims are not necessarily limited to the specific features or methods described. Rather, the specific features and methods are disclosed as example implementations of systems for generating anti-aliased vector objects, and other equivalent features and methods are intended to be within the scope of the appended claims. Further, various different examples are described and it is to be appreciated that each described example is implementable independently or in connection with one or more other described examples.

What is claimed is:

1. A method comprising:
  receiving, by a processing device, input data describing a Bezier curve of a vector object;
  generating, by the processing device, an aliased curve by rasterizing the Bezier curve in a pixel space having pixels including intersected pixels that are intersected by the aliased curve and non-intersected pixels that are not intersected by the aliased curve;
  segmenting, by the processing device, the pixels into segments in a virtual space, the segments having a higher density than the pixels;

identifying, by the processing device, an intersected segment that is intersected by a portion of the aliased curve in the virtual space;

determining, by the processing device, a first winding number for the intersected segment in the virtual space by determining whether the aliased curve crosses a center point of the intersected segment;

determining, by the processing device, a second winding number for the intersected segment in the pixel space by mapping the intersected segment to an intersected pixel and determining a winding number for the intersected pixel in the pixel space; and generating, by the processing device, a portion of an anti-aliased curve for display in a user interface by applying a color value to a coverage mask for the intersected pixel, the coverage mask computed based on the first winding number and the second winding number.

2. The method as described in claim 1, wherein the intersected segment is included in the intersected pixel.

3. The method as described in claim 2, wherein the coverage mask is computed based on a number of the segments that are included in the intersected pixel in the virtual space.

4. The method as described in claim 1, wherein determining the first winding number includes determining a direction of the portion of the aliased curve.

5. The method as described in claim 4, further comprising:
identifying an initial intersection point between the portion of the aliased curve and the intersected segment based on the direction; and
determining that a coordinate of the initial intersection point is less than a corresponding coordinate of the center point of the intersected segment.

6. The method as described in claim 4, further comprising:
identifying a final intersection point between the portion of the aliased curve and the intersected segment based on the direction; and
determining that a coordinate of the final intersection point is greater than or equal to a corresponding coordinate of the center point of the intersected segment.

7. The method as described in claim 1, further comprising:
determining a winding number for an additional intersected pixel of the pixels; and
determining that the winding number for the additional intersected pixel follows a fill rule for the anti-aliased curve.

8. The method as described in claim 7, wherein the fill rule is an even-odd fill rule or a non-zero fill rule.

9. The method as described in claim 7, further comprising determining that the additional intersected pixel is a beginning of a scanline segment in a scanline if a next intersected pixel in the scanline is more than one pixel away from the additional intersected pixel.

10. The method as described in claim 9, further comprising identifying a number of pixels included in the scanline segment based on a position of the next intersected pixel.

11. The method as described in claim 1, further comprising identifying a duplicate segment of the intersected segment that has a same position in the virtual space as the intersected segment, and marking the duplicate segment such that the processing device does not consider the duplicate segment.

12. A system comprising:
a memory component; and
a processing device coupled to the memory component, the processing device to perform operations comprising:
receiving input data describing a Bezier curve of a vector object;
generating an aliased curve by rasterizing the Bezier curve in a pixel space having pixels including intersected pixels that are intersected by the aliased curve and non-intersected pixels that are not intersected by the aliased curve;
segmenting the pixels into segments in a virtual space, the segments having a higher density than the pixels;
identifying intersected segments of the segments that are intersected by the aliased curve in the virtual space;
determining multiple winding numbers for at least one intersected segment of the intersected segments, the multiple winding numbers including:
a first winding number for the at least one intersected segment in the virtual space, the first winding number determined based on whether the aliased curve crosses a center point of the at least one intersected segment; and
a second winding number for the at least one intersected segment in the pixel space;
computing a coverage mask for an intersected pixel of the pixels that includes the at least one intersected segment based on the multiple winding numbers for the at least one intersected segment; and
generating a portion of an anti-aliased curve for display in a user interface by applying a color value to the coverage mask for the intersected pixel.

13. The system as described in claim 12, wherein the coverage mask for the intersected pixel is computed based on a number of the segments that are included in the intersected pixel in the virtual space.

14. The system as described in claim 13, wherein the intersected pixel includes at least one non-intersected segment that is not intersected by a portion of the aliased curve in the virtual space.

15. The system as described in claim 12, wherein the operations further comprise:
determining a winding number for an additional intersected pixel of the pixels; and
determining that the winding number for the additional intersected pixel follows an even-odd fill rule or a non-zero fill rule.

16. The system as described in claim 12, wherein the second winding number for the at least one intersected segment is determined by mapping the at least one intersected segment to the intersected pixel and determining a winding number for the intersected pixel in the pixel space.

17. A non-transitory computer-readable storage medium storing executable instructions, which when executed by a processing device, the processing device performs operations comprising:
receiving input data describing a Bezier curve of a vector object;
generating an aliased curve by rasterizing the Bezier curve in a pixel space having pixels including intersected pixels that are intersected by the aliased curve and non-intersected pixels that are not intersected by the aliased curve;
segmenting the pixels into segments in a virtual space;
identifying an intersected segment that is intersected by a portion of the aliased curve in the virtual space;

determining a first winding number for the intersected segment in the virtual space by determining whether the aliased curve crosses a center point of the intersected segment;

determining a second winding number for the intersected segment in the pixel space by mapping the intersected segment to an intersected pixel and determining a winding number for the intersected pixel in the pixel space; and generating, for display in a user interface, a portion of an anti-aliased curve by applying a color value to a coverage mask for the intersected pixel, the coverage mask computed based on the first winding number and the second winding number.

18. The non-transitory computer-readable storage medium as described in claim 17, wherein the intersected segment is included in the intersected pixel and the coverage mask is computed based on a number of the segments that are included in the intersected pixel in the virtual space.

19. The non-transitory computer-readable storage medium as described in claim 18, wherein the intersected pixel includes at least one non-intersected segment that is not intersected by the aliased curve in the virtual space.

20. The non-transitory computer-readable storage medium as described in claim 17, wherein determining the first winding number includes determining a direction of the portion of the aliased curve.

\* \* \* \* \*